(12) United States Patent
Sumitani et al.

(10) Patent No.: US 12,043,741 B2
(45) Date of Patent: Jul. 23, 2024

(54) CONJUGATED DIENE-BASED POLYMER COMPOSITION AND TIRE

(71) Applicant: Asahi Kasei Kabushiki Kaisha, Tokyo (JP)

(72) Inventors: Shogo Sumitani, Tokyo (JP); Shinichi Sekikawa, Tokyo (JP); Kenta Hisamura, Tokyo (JP); Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 563 days.

(21) Appl. No.: 17/195,769

(22) Filed: Mar. 9, 2021

(65) Prior Publication Data

US 2021/0284827 A1    Sep. 16, 2021

(30) Foreign Application Priority Data

Mar. 10, 2020 (JP) .................. 2020-040982
Jan. 26, 2021 (JP) .................. 2021-009985

(51) Int. Cl.
*B60C 1/00* (2006.01)
*C08L 9/06* (2006.01)

(52) U.S. Cl.
CPC ............. *C08L 9/06* (2013.01); *B60C 1/0016* (2013.01); *C08L 2205/03* (2013.01)

(58) Field of Classification Search
CPC .......... C08L 9/00; C08L 9/06; C08L 2205/02
See application file for complete search history.

(56) References Cited

U.S. PATENT DOCUMENTS

2018/0162167 A1    6/2018  Kyo et al.
2021/0214484 A1 *  7/2021  Hisamura .............. C08L 15/02

FOREIGN PATENT DOCUMENTS

| CA | 2948708 | A1 * | 5/2017 | ............ B60C 1/00 |
|----|---------|------|--------|----------------------|
| CN | 102311122 | A | 1/2012 | |
| CN | 107636023 | A | 1/2018 | |
| CN | 110655697 | A | 1/2020 | |
| CN | 110818975 | A | 2/2020 | |
| CN | 110862590 | A | 3/2020 | |
| JP | S62-012608 | A | 1/1987 | |
| JP | H11-189616 | A | 7/1999 | |
| JP | 2003-171418 | A | 6/2003 | |
| JP | 2005-290355 | A | 10/2005 | |
| JP | 2013-082826 | A | 5/2013 | |
| JP | 2018-002986 | A | 1/2018 | |
| JP | 2018-028018 | A | 2/2018 | |
| JP | 2020-033546 | A | 3/2020 | |
| WO | WO-2019244850 | A1 * | 12/2019 | |
| WO | WO-2020070961 | A1 * | 4/2020 | ............ B60C 1/00 |

* cited by examiner

*Primary Examiner* — Marc S Zimmer
*Assistant Examiner* — Jeffrey S Lenihan
(74) *Attorney, Agent, or Firm* — Morgan, Lewis & Bockius LLP

(57) ABSTRACT

The present invention provides a conjugated diene-based polymer composition excellent in rolling resistance, grip performance on a wet road surface, and abrasion resistance when formed into a tire.

Also provided is a conjugated diene-based polymer composition containing: 10 to 90 parts by mass of a conjugated diene-based polymer (A) having a glass transition temperature of $-20°$ C. or more; and 10 to 90 parts by mass of a conjugated diene-based polymer (B) having a glass transition temperature of $-25°$ C. or less, wherein the conjugated diene-based polymer (A) has an absolute molecular weight, measured by viscosity detector-equipped GPC-light scattering measurement, of $40 \times 10^4$ or more and $5000 \times 10^4$ or less, and a branch number (Bn), measured by the viscosity detector-equipped GPC-light scattering measurement, of 8 or more.

13 Claims, No Drawings

CONJUGATED DIENE-BASED POLYMER COMPOSITION AND TIRE

TECHNICAL FIELD

The present invention relates to a conjugated diene-based polymer composition, and a tire.

BACKGROUND ART

There have been increasing demands for reduction of fuel consumption in vehicles, and improvement of materials of a vehicle tire, particularly, of a tire tread in contact with the ground is required.

Recently, development of a material having low rolling resistance, namely, having a low hysteresis loss property, has been demanded.

Besides, in order to reduce the weight of a tire, it is necessary to reduce the thickness of a tread portion, and there is a demand also for a material having high abrasion resistance. On the other hand, a material used for a tire tread is required, from the viewpoint of safety, to be excellent in wet skid resistance and have practically sufficient fracture performance.

An example of a rubber material meeting the aforementioned requirements includes a rubber composition containing a rubber-like polymer and a reinforcing filler such as carbon black or silica.

It has been already known that when silica is used as the reinforcing filler, balance between a low hysteresis loss property and wet skid resistance is improved.

Besides, an attempt has been made to reduce a hysteresis loss and to improve abrasion resistance and fracture strength by improving dispersibility of silica in a rubber composition through introduction of a functional group having affinity or reactivity with silica into a molecular end of a rubber-like polymer having high mobility, and further by reducing the mobility of the molecular end of the rubber-like polymer through a bond to a silica particle. For example, a composition of a modified conjugated diene-based polymer obtained by reacting an alkoxysilane having an amino group with a conjugated diene-based polymer active end, and silica has been proposed (see, e.g., Patent Documents 1 to 3).

On the other hand, it is known that when a hysteresis loss is to be reduced in a tread portion in order to further reduce rolling resistance of a tire, grip performance on a wet road surface is deteriorated. In consideration of these circumstances, it has been proposed that a modified conjugated rubber composition containing a specific modified conjugated diene-based polymer, a silica-based inorganic filler, and a tackifier, namely, a thermoplastic resin, is excellent in a low rolling property and grip performance on a wet road surface (see, e.g., Patent Document 4).

CITATION LIST

Patent Document

Patent Document 1: Japanese Patent Application Laid-Open No. 2005-290355
Patent Document 2: Japanese Patent Application Laid-Open No. 11-189616
Patent Document 3: Japanese Patent Application Laid-Open No. 2003-171418
Patent Document 4: Japanese Patent Application Laid-Open No. 2018-28018

SUMMARY OF INVENTION

Technical Problem

The modified conjugated rubber composition containing a thermoplastic resin described in Patent Document 4 has, however, the following problem: A thermoplastic resin has a low affinity with a silica-based inorganic filler, and hence the dispersibility of the silica-based inorganic filler is deteriorated to increase a hysteresis loss. In this point of view, rolling resistance of a tire obtained from the composition is deteriorated, and in addition, abrasion resistance is deteriorated because an interface reinforcing effect of the silica-based inorganic filler is reduced.

Therefore, an object of the present invention is to provide a conjugated diene-based polymer composition from which a tire excellent in rolling resistance, grip performance on a wet road surface, and abrasion resistance can be obtained.

Solution to Problem

The present inventors have made earnest studies for solving the above-described problems of the related art, resulting in finding the following: When a conjugated diene-based polymer composition containing a conjugated diene-based polymer (A) and a conjugated diene-based polymer (B), that is, two types of conjugated diene-based polymers having different glass transition temperatures, in which the conjugated diene-based polymer (A) has an absolute molecular weight falling in a prescribed range, and a branch number (Bn) falling in a prescribed range, is formed into a tire, the resultant tire is excellent in rolling resistance, grip performance on a wet road surface, and abrasion resistance. Thus, the present invention was accomplished.

Specifically, the present invention provides the following:

[1]
A conjugated diene-based polymer composition comprising:
  10 to 90 parts by mass of a conjugated diene-based polymer (A) having a glass transition temperature of −20° C. or more; and
  10 to 90 parts by mass of a conjugated diene-based polymer (B) having a glass transition temperature of −25° C. or less,
  wherein the conjugated diene-based polymer (A) has an absolute molecular weight, measured by viscosity detector-equipped GPC-light scattering measurement, of $40 \times 10^4$ or more and $5000 \times 10^4$ or less, and a branch number (Bn), measured by the viscosity detector-equipped GPC-light scattering measurement, of 8 or more.

[2]
The conjugated diene-based polymer composition according to [1], wherein the conjugated diene-based polymer (B) has a glass transition temperature of −55° C. or less.

[3]
The conjugated diene-based polymer composition according to [1] or [2], comprising 0.5 parts by mass or more and 30 parts by mass or less of a thermoplastic resin with respect to 100 parts by mass of a total amount of the conjugated diene-based polymers (A) and (B).

[4]
The conjugated diene-based polymer composition according to any one of [1] to [3], wherein the conjugated diene-based polymer (A) and/or the conjugated diene-based polymer (B) is modified.

[5]
The conjugated diene-based polymer composition according to [4], wherein the conjugated diene-based polymer (A) has a modification ratio of 60% by mass or more.

[6]
The conjugated diene-based polymer composition according to any one of [3] to [5], wherein a content of the thermoplastic resin is 0.5 parts by mass or more and 10 parts by mass or less with respect to 100 parts by mass of the total amount of the conjugated diene-based polymers (A) and (B).

[7]
The conjugated diene-based polymer composition according to any one of [1] to [6], wherein the conjugated diene-based polymer (A) is a conjugated diene-based polymer having a star polymer structure having 3 or more branches, in which at least one branched chain of the star structure includes a portion derived from a vinyl-based monomer containing an alkoxysilyl group or a halosilyl group, and a polymer chain is branched in the portion derived from a vinyl-based monomer containing an alkoxysilyl group or a halosilyl group.

[8]
The conjugated diene-based polymer composition according to [7], wherein the portion, of the conjugated diene-based polymer (A), derived from a vinyl-based monomer containing an alkoxysilyl group or a halosilyl group is a monomer unit based on a compound represented by the following formula (1) or (2), and has a branch point of a polymer chain containing the monomer unit based on the compound represented by the following formula (1) or (2), and at least one end of the conjugated diene-based polymer (A) is coupled by using a coupling agent:

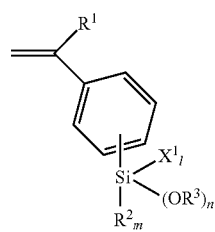

(1)

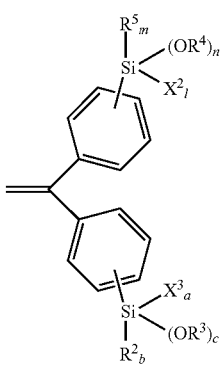

(2)

wherein in the formula (1), $R^1$ represents a hydrogen atom, an alkyl group having 1 to 20 carbon atoms, or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

[9]
The conjugated diene-based polymer composition according to [8], comprising the conjugated diene-based polymer (A) containing a monomer unit based on a compound represented by the formula (1) wherein $R^1$ is a hydrogen atom, and m is 0.

[10]
The conjugated diene-based polymer composition according to [8], comprising the conjugated diene-based polymer (A) containing a monomer unit based on a compound represented by the formula (2) wherein m is 0, and b is 0.

[11]
The conjugated diene-based polymer composition according to [8] or [9], comprising the conjugated diene-based polymer (A) containing a monomer unit based on a compound represented by the formula (1) wherein $R^1$ is a hydrogen atom, m is 0, and l is 0.

[12]
The conjugated diene-based polymer composition according to [8] or [10], comprising the conjugated diene-based polymer (A) containing a monomer unit based on a compound represented by the formula (2) wherein m is 0, l is 0, a is 0, and b is 0.

[13]
The conjugated diene-based polymer composition according to any one of [8], [9] and [11], comprising the conjugated diene-based polymer (A) containing a monomer unit based on a compound represented by the formula (1) wherein $R^1$ is a hydrogen atom, l is 0, and n is 3.

[14]
A tire comprising the conjugated diene-based polymer composition according to any one of [1] to [13].

Advantageous Effects of Invention

According to the present invention, a conjugated diene-based polymer composition that is excellent in rolling resistance, grip performance on a wet road surface, and abrasion resistance when formed into a tire can be provided.

DESCRIPTION OF EMBODIMENTS

Now, an embodiment for practicing the present invention (hereinafter referred to as the "present embodiment") will be described in detail.

It is noted that the following present embodiment is merely an example for describing the present invention and the present invention is not limited to the following description but may be variously modified within the scope thereof.

[Conjugated Diene-Based Polymer Composition]

A conjugated diene-based polymer composition of the present embodiment contains: 10 to 90 parts by mass of a conjugated diene-based polymer (A) having a glass transition temperature of −20° C. or more; and 10 to 90 parts by mass of a conjugated diene-based polymer (B) having a glass transition temperature of −25° C. or less.

The conjugated diene-based polymer (A) has an absolute molecular weight, measured by viscosity detector-equipped GPC-light scattering measurement, of $40 \times 10^4$ or more and $5000 \times 10^4$ or less, and a branch number (Bn), measured by the viscosity detector-equipped GPC-light scattering measurement, of 8 or more.

When the conjugated diene-based polymer composition of the present embodiment is used, a rubber composition excellent in rolling resistance, grip performance on a wet road surface, and abrasion resistance can be obtained.

(Conjugated Diene-Based Polymer (A))

The conjugated diene-based polymer (A) contained in the conjugated diene-based polymer composition of the present embodiment has a glass transition temperature of −20° C. or more, an absolute molecular weight, measured by viscosity detector-equipped GPC-light scattering measurement, of $40 \times 10^4$ or more and $5000 \times 10^4$ or less, and a branch number (Bn), measured by viscosity detector-equipped GPC-light scattering measurement, of 8 or more.

The conjugated diene-based polymer (A) contains a conjugated diene-based compound as a monomer unit, may contain an aromatic vinyl compound, and may further contain another monomer unit. Preferably, it contains an aromatic vinyl compound and a conjugated diene-based compound as principal components, and a ratio of these is preferably 90% by mass or more, and more preferably 95% by mass or more.

A rubber component for a tire tread generally contains no component in addition to an aromatic vinyl compound and a conjugated diene-based compound.

From the viewpoint of improving grip performance on a wet road surface, the conjugated diene-based polymer composition of the present embodiment contains 10 to 90 parts by mass of the conjugated diene-based polymer (A) with respect to a total amount (100 parts by mass) of the conjugated diene-based polymer composition.

From the viewpoint of improving abrasion resistance, the content of the conjugated diene-based polymer (A) is preferably 20 parts by mass or more, and more preferably 30 parts by mass or more. From the viewpoint of reducing rolling resistance, the content is preferably 80 parts by mass or less, and more preferably 70 parts by mass or less.

<Glass Transition Temperature of Conjugated Diene-Based Polymer (A)>

The conjugated diene-based polymer (A) contained in the conjugated diene-based polymer composition of the present embodiment has a glass transition temperature of −20° C. or more.

The glass transition temperature can be controlled to fall in the numerical range by adjusting a microstructure of the conjugated diene-based polymer (A), namely, by adjusting an amount of the aromatic vinyl compound in the conjugated diene-based polymer (A), or an amount of bound vinyl in the conjugated diene-based compound.

Specifically, when the conjugated diene-based polymer (A) is a copolymer of the aromatic vinyl compound and the conjugated diene-based compound, the glass transition temperature can be increased by increasing the amount of the aromatic vinyl compound, or by increasing the amount of bound vinyl in the conjugated diene-based compound.

A method for setting the glass transition temperature of the conjugated diene-based polymer (A) to −20° C. or more is not especially limited, and the glass transition temperature can be set to fall within the above-described range by, for example, setting the amount of the aromatic vinyl compound to 30 to 45% by mass and setting the amount of bound vinyl in the conjugated diene-based compound to 10 to 70% by mass. If the glass transition temperature falls in the above-described range, grip performance tends to be further improved.

With respect to the glass transition temperature, a peak top (an inflection point) of a DSC differential curve obtained by recording a DSC curve during temperature increase in a prescribed temperature range in accordance with ISO 22768: 2006 is defined as the glass transition temperature. Specifically, the glass transition temperature can be measured in accordance with a method described in examples below.

An upper limit of the glass transition temperature of the conjugated diene-based polymer (A) is not especially limited, and is preferably 0° C. or less. When the glass transition temperature is in this range, rolling resistance tends to be further excellent.

<Absolute Molecular Weight of Conjugated Diene-Based Polymer (A)>

From the viewpoints of abrasion resistance and fracture performance of the conjugated diene-based polymer composition of the present embodiment, the conjugated diene-based polymer (A) has an absolute molecular weight, measured by viscosity detector-equipped GPC-light scattering measurement, of $40 \times 10^4$ or more and $5000 \times 10^4$ or less.

In general, a polymer having a branch structure tends to have a smaller molecule when compared with a straight-chain polymer having the same molecular weight. Therefore, in employing a molecular weight in terms of polystyrene obtained by gel permeation chromatography (GPC), which is relative comparison with a standard polystyrene sample for screening a polymer in accordance with the size of a molecule, the molecular weight of a polymer having a branch structure tends to be underestimated.

On the other hand, as for an absolute molecular weight measured by viscosity detector-equipped GPC-light scattering measurement, a molecular weight (absolute molecular weight) is measured by directly observing the size of a molecule by a light scattering method, and hence, as compared with a molecular weight in terms of polystyrene obtained by gel permeation chromatography (GPC), is not affected by a structure of the polymer or interaction with a column filler. Therefore, the molecular weight can be accurately measured without being affected by a polymer structure such as a branch structure of a conjugated diene-based polymer.

The absolute molecular weight of the conjugated diene-based polymer (A) is $40 \times 10^4$ or more, preferably $50 \times 10^4$ or more, more preferably $60 \times 10^4$ or more, further preferably $80 \times 10^4$ or more, and still further preferably $100 \times 10^4$ or more.

The absolute molecular weight of the conjugated diene-based polymer (A) is $5000 \times 10^4$ or less, preferably $4500 \times 10^4$ or less, more preferably $4000 \times 10^4$ or less, further preferably $3500 \times 10^4$ or less, and still further preferably $3000 \times 10^4$ or less.

If the absolute molecular weight of the conjugated diene-based polymer (A) is $40 \times 10^4$ or more, abrasion resistance obtained when in the form of a vulcanizate tends to be excellent. If the absolute molecular weight is 5000×10$^4$ or less, processability and dispersibility of a filler obtained when used for obtaining a vulcanizate are excellent, and wet grip performance is excellent.

The absolute molecular weight of the conjugated diene-based polymer (A) can be measured by a method described in examples below.

The absolute molecular weight of the conjugated diene-based polymer (A) can be controlled to fall in the above-described numerical range by adjusting an amount of a polymerization initiator to be added, the number of functional groups of a branching agent, an amount of the branching agent to be added, timing of adding the branching agent, and amounts of a coupling agent and a modifier to be added.

<Branch Number of Conjugated Diene-Based Polymer (A)>

From the viewpoints of processability and wet grip performance, the conjugated diene-based polymer (A) has a branch number (Bn) of 8 or more.

The branch number (Bn) being 8 or more means that the conjugated diene-based polymer (A) has 8 or more polymer chains as side chains with respect to a substantially longest polymer main chain.

The branch number (Bn) of a conjugated diene-based polymer (A) is defined, by using a contracting factor (g') measured by viscosity detector-equipped GPC-light scattering measurement, as g'=6Bn/{(Bn+1) (Bn+2)}.

In general, a polymer having a branch tends to have a smaller molecule when compared with a straight-chain polymer having the same absolute molecular weight.

The contracting factor (g') is an index of a size ratio occupied by a molecule in a straight-chain polymer assumed to have the same absolute molecular weight. In other words, when the branch number of a polymer is increased, the contracting factor (g') tends to be reduced.

For the contracting factor, an intrinsic viscosity is used as an index of the size of a molecule in this embodiment, and a straight-chain polymer satisfies the relationship: intrinsic viscosity [η]=−3.883 M$^{0.771}$, wherein M represents an absolute molecular weight.

The contracting factor (g') expresses, however, a decreasing ratio of the size of a molecule and does not accurately express a branch structure of the polymer.

Therefore, the branch number (Bn) of the conjugated diene-based polymer (A) is calculated by using a value of the contracting factor (g') obtained at each absolute molecular weight of the conjugated diene-based polymer (A). The thus calculated "branch number (Bn)" accurately expresses the number of polymers directly or indirectly bonded to a longest main chain structure.

The calculated branch number (Bn) can be an index expressing a branch structure of a conjugated diene-based polymer (A). For example, in a general 4-branched star polymer (having 4 polymer chains connected to a center portion), two polymer chain arms are bonded to a longest highly branched main chain structure, and hence the branch number (Bn) is evaluated as 2.

In a general 8-branched star polymer, 6 polymer chain arms are bonded to a longest highly branched main chain structure, and the branch number (Bn) is evaluated as 6.

The conjugated diene-based polymer (A) has the branch number (Bn) of 8 or more, and such a case means that it is a conjugated diene-based polymer having, as a star polymer structure, branches similar to a 10-branched star polymer structure.

Here, a "branch" is formed by a direct or indirect bond of one polymer to another polymer. Besides, the "branch number (Bn)" corresponds to the number of polymers directly or indirectly bonded to a longest main chain structure.

If the branch number (Bn) is 8 or more, the conjugated diene-based polymer (A) is excellent in processability and wet grip performance when in the form of a vulcanizate.

In general, increase of an absolute molecular weight tends to deteriorate processability, and when an absolute molecular weight is increased in a straight chain polymer structure, a vulcanizate obtained therefrom is largely increased in the viscosity and largely deteriorated in the processability. Therefore, even when a large number of functional groups are introduced into the polymer to improve affinity and/or reactivity with silica to be blended as a filler, the silica cannot be sufficiently dispersed in the polymer in kneading process. As a result, the function of the introduced functional groups cannot be exhibited, and hence, an originally expected effect of improving wet grip performance by the introduction of the functional groups cannot be exhibited.

On the other hand, in the conjugated diene-based polymer composition of the present embodiment, since the conjugated diene-based polymer (A) is specified to have a branch number (Bn) of 8 or more, the increase of the viscosity of a vulcanizate obtained therefrom due to increase of the absolute molecular weight is largely suppressed, and hence the polymer can be sufficiently mixed with silica or the like in the kneading process, so that the silica can be dispersed around the conjugated diene-based polymer (A). As a result, abrasion resistance can be improved by setting a molecular weight of the conjugated diene-based polymer (A) to be high, and in addition, silica can be dispersed around the conjugated diene-based polymer (A) by sufficient kneading so as to make functional groups to act and/or react, and thus, a practically sufficient wet grip property can be attained.

The branch number of the conjugated diene-based polymer (A) can be measured by a method described in the examples below.

The branch number (Bn) of the conjugated diene-based polymer (A) is 8 or more, preferably 10 or more, more preferably 12 or more, and further preferably 15 or more.

If the branch number (Bn) of the conjugated diene-based polymer (A) is in the above-described range, processability obtained when used for obtaining a vulcanizate tends to be excellent.

The upper limit of the branch number (Bn) is not especially limited, and may be equal to or larger than a detection limit, and is preferably 84 or less, more preferably 80 or less, further preferably 64 or less, and still further preferably 57 or less.

If the branch number (Bn) is 84 or less, abrasion resistance obtained when used for obtaining a vulcanizate tends to be excellent.

The branch number of the conjugated diene-based polymer (A) can be controlled to be 8 or more by adjusting, in combination, an amount of a branching agent to be added and an amount of an end modifier to be added. Specifically, the branch number can be controlled by adjusting the number of functional groups of a branching agent, an amount of the branching agent to be added, timing of adding the branching agent, and an amount of a modifier or a coupling agent to be added. More specific description will be given in (Production Method for Conjugated Diene-based Polymer (A)) described below.

<Modification Ratio of Conjugated Diene-Based Polymer (A)>

From the viewpoint of improvement of low fuel consumption performance, the conjugated diene-based polymer (A) is preferably modified with a prescribed modifier, such as a nitrogen-containing modifier, and a modification ratio is preferably 60% by mass or more with respect to the total amount of conjugated diene-based polymers.

Herein, the term "modification ratio" refers to a mass ratio of a conjugated diene-based polymer having a functional group derived from a modifier, such as a nitrogen-containing functional group, to the total amount of conjugated diene-based polymers.

For example, assuming that a nitrogen-containing modifier is reacted with a terminal end, a mass ratio of a conjugated diene-based polymer having a nitrogen-containing functional group owing to the nitrogen-containing modifier to a total amount of conjugated diene-based polymers is expressed as a modification ratio.

On the other hand, also when a polymer is branched by using a branching agent containing nitrogen, the thus generated conjugated diene-based polymer has a nitrogen-containing functional group, and such a branched polymer is also counted in calculation of a modification ratio.

In other words, herein, when a conjugated diene-based polymer is particularly a "modified conjugated diene-based polymer" having been modified, a mass ratio of a sum of a modified polymer obtained by using a modifier having a nitrogen-containing functional group and/or a branched polymer obtained by using a branching agent having a nitrogen-containing functional group corresponds to the modification ratio.

The modification ratio of the conjugated diene-based polymer (A) is preferably 65% by mass or more, more preferably 70% by mass or more, further preferably 75% by mass or more, still more preferably 80% by mass or more, and still further preferably 82% by mass or more.

If the modification ratio is 60% by mass or more, low fuel consumption performance obtained when in the form of a vulcanizate tends to be excellent.

It is noted that the "conjugated diene-based polymer" herein encompasses a modified conjugated diene-based polymer having been modified (containing a functional group) unless otherwise stated.

The modification ratio can be measured by chromatography capable of separating a functional group-containing modified component and a non-modified component.

As a method using chromatography, a method using a column for gel permeation chromatography using, as a filler, a polar material such as silica adsorbing a specific functional group, for performing quantitative determination using an internal standard of a non-adsorbed component can be employed.

More specifically, the modification ratio is obtained by measuring an amount of adsorption onto a silica column based on a difference between a chromatogram measured by using a polystyrene-based gel column and a chromatogram measured by using a silica-based column obtained from a sample solution containing a sample and low molecular weight internal standard polystyrene. More specifically, the modification ratio is measured by a method described in the examples below.

In the conjugated diene-based polymer (A), the modification ratio can be controlled by selecting a prescribed compound as a polymerization initiator, by selecting a prescribed compound as a polymerizable monomer, by adjusting the amount of a modifier to be added, and by adjusting a reaction method, and thus, can be controlled to 60% by mass or more.

For example, a method in which polymerization is performed by using, as a polymerization initiator, an organic lithium compound, described later, having at least one nitrogen atom in a molecule, a method in which a monomer having at least one nitrogen atom in a molecule is copolymerized, and a method in which a modifier having a structural formula described later is used are combined, and polymerization conditions are controlled, and thus, the modification ratio can be obtained.

<Structure of Conjugated Diene-Based Polymer (A)>

From the viewpoint of balance between processability and abrasion resistance, the conjugated diene-based polymer (A) is a conjugated diene-based polymer having a star polymer structure having 3 or more branches, in which at least one branched chain of the star structure includes a portion derived from a vinyl-based monomer containing an alkoxysilyl group or a halosilyl group, and a polymer chain is further branched in the portion derived from a vinyl-based monomer containing an alkoxysilyl group or a halosilyl group, namely, a conjugated diene-based polymer having a main chain branch structure.

Herein, the term "star polymer structure" refers to a structure in which a plurality of polymer chains (arms) are bonded to one central branch point.

The one central branch point herein contains a "substituent containing an atom derived from a coupling agent" or a "substituent containing a nitrogen atom derived from a modifier".

The term "main branch structure" herein refers to a structure in which a polymer chain forms a branch point in the portion derived from a vinyl-based monomer containing an alkoxysilyl group or a halosilyl group, and a polymer chain (arm) extends from the branch point.

In the conjugated diene-based polymer (A), from the viewpoint of improving the branch number Bn, the number of main chain branch points constituted by the portion derived from a vinyl-based monomer containing an alkoxysilyl group or a halosilyl group is 4 or more, and a branch structure derived from a star polymer structure formed by a modifier in a reaction step includes preferably 3 or more branches, more preferably 4 or more branches, and further preferably 8 or more branches.

Although the branch number Bn is increased both by modification with a coupling agent for obtaining a star structure and by introduction of a branching agent into the polymer, contribution to the branch number Bn is larger when a whole polymer chain is branched by using a coupling agent.

In design of a polymer, the branch number Bn can be controlled in accordance with selection of a coupling agent, and selection of a type of and setting of an amount of a branching agent, and the branch number Bn can be more easily controlled by taking a contribution rate into consideration.

<Main Chain Branch Structure>

The main chain branch structure corresponds to branch points in the portion derived from a vinyl-based monomer containing an alkoxysilyl group or a halosilyl group, and includes 2 or more branch points, preferably 3 or more branch points, and further preferably 4 or more branch points.

The branch point forming the main branch structure has preferably at least 2 or more polymer chains, more preferably 3 or more polymer chains not corresponding to a main chain, and further preferably 4 or more polymer chains not corresponding to a main chain.

Particularly in a main chain branch structure containing a vinyl-based monomer containing an alkoxysilyl group or a halosilyl group, a peak derived from the main chain branch structure is detected, in signal detection by $^{29}$Si-NMR, in a range of −45 ppm to −65 ppm, and more restrictively in a range of −50 ppm to −60 ppm.

<Star Polymer Structure>

The conjugated diene-based polymer (A) preferably has a star polymer structure, and the number of branches derived from the star polymer structure is preferably 3 or more, more preferably 4 or more, further preferably 6 or more, and still further preferably 8 or more.

In a method for obtaining, as the conjugated diene-based polymer (A), a conjugated diene-based polymer having a star polymer structure including 3 or more branches in which at least one branched chain of the star structure includes a portion derived from a vinyl-based monomer containing an alkoxysilyl group or a halosilyl group, and the portion derived from the vinyl-based monomer containing the alkoxysilyl group or the halosilyl group further includes a main chain branch structure, the "star polymer structure" can be formed by adjusting the number of functional groups of a modifier and an amount of the modifier to be added, and the "main chain branch structure" can be controlled by adjusting the number of functional groups of a branching agent, an amount of the branching agent to be added, and timing of adding the branching agent.

In order to obtain a conjugated diene-based polymer having a star polymer structure having 3 or more branches in which at least one branched chain of the star structure includes a portion derived from a vinyl-based monomer containing an alkoxysilyl group or a halosilyl group, and the portion derived from a vinyl-based monomer containing the alkoxysilyl group or the halosilyl group further includes a main chain branch structure, for example, a method in which polymerization is performed by using an organic lithium-based compound as a polymerization initiator, a branching agent for imparting a specific branch point is added during or after the polymerization, and modification is performed by using a modifier for imparting a specific branching ratio after continuation of the polymerization can be employed.

Control means for such polymerization conditions will be described later as a production method in the examples.

<Detailed Structure of Main Chain Branch Structure>

The conjugated diene-based polymer (A) is preferably a conjugated diene-based polymer in which the portion derived from a vinyl-based monomer containing an alkoxysilyl group or a halosilyl group is a monomer unit based on a compound represented by the following formula (1) or (2), includes a branch point of a polymer chain containing the monomer unit based on the compound represented by formula (1) or (2), and has at least one end of the conjugated diene-based polymer coupled by using a coupling agent, and the at least one end of the conjugated diene-based polymer is more preferably modified with a nitrogen atom-containing group.

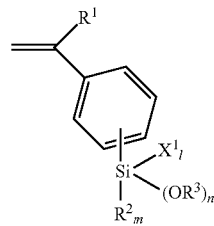

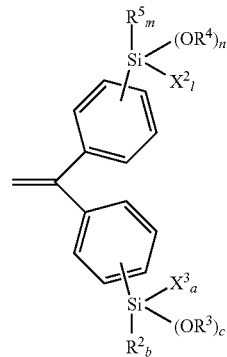

In formula (1), $R^1$ represents a hydrogen atom, an alkyl group having 1 to 20 carbon atoms, or an aryl group having 6 to 20 carbon atoms, and may have a branch structure in a part thereof.

$R^2$ and $R^3$ each independently represent an alkyl group having 1 to 20 carbon atoms, or an aryl group having 6 to 20 carbon atoms, and may have a branch structure in a part thereof.

Each of $R^1$ to $R^3$, if present in a plural number, is respectively independent.

$X^1$ represents an independent halogen atom.

m represents an integer of 0 to 2, n represents an integer of 0 to 3, l represents an integer of 0 to 3, and (m+n+l) is 3.

In formula (2), $R^2$ to $R^5$ each independently represent an alkyl group having 1 to 20 carbon atoms, or an aryl group having 6 to 20 carbon atoms, and may have a branch structure in a part thereof. Each of $R^2$ to $R^5$, if present in a plural number, is respectively independent.

$X^2$ and $X^3$ represent an independent halogen atom.

m represents an integer of 0 to 2, n represents an integer of 0 to 3, l represents an integer of 0 to 3, and (m+n+l) is 3.

a represents an integer of 0 to 2, b represents an integer of 0 to 3, c represents an integer of 0 to 3, and (a+b+c) is an integer of 3.

The conjugated diene-based polymer (A) preferably has a monomer unit based on a compound represented by formula (1) in which $R^1$ is a hydrogen atom and m is 0.

Thus, the branch number is improved, and an effect of improving abrasion resistance and processability can be obtained.

Besides, the conjugated diene-based polymer (A) preferably has a monomer unit based on a compound represented by the formula (2) wherein m is 0, and b is 0.

Thus, the effect of improving abrasion resistance and processability can be obtained.

Further alternatively, the conjugated diene-based polymer (A) preferably has a monomer unit based on a compound represented by formula (1) in which $R^1$ is a hydrogen atom, m is 0 and l is 0.

Thus, the branch number is improved, and the effect of improving abrasion resistance and processability is obtained.

Alternatively, the conjugated diene-based polymer (A) is preferably a conjugated diene-based polymer having a monomer unit based on a compound represented by formula (2) in which m is 0, l is 0, a is 0, and b is 0.

Thus, the effect of improving abrasion resistance and processability can be obtained.

The conjugated diene-based polymer (A) is a conjugated diene-based polymer having a monomer unit based on a compound represented by formula (1) in which $R^1$ is a hydrogen atom, l is 0, and n is 3.

Thus, the modification ratio and the branch number are improved, and an effect of improving low fuel consumption performance, abrasion resistance, and processability can be obtained.

<Branching Agent>

In constructing a main chain branch structure of the conjugated diene-based polymer (A), a branching agent represented by the following formula (1) or (2) is preferably used as the branching agent.

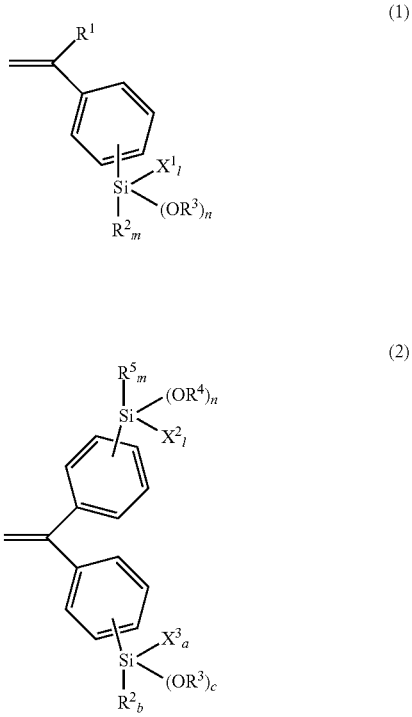

In formula (1), $R^1$ represents a hydrogen atom, an alkyl group having 1 to 20 carbon atoms, or an aryl group having 6 to 20 carbon atoms, and may have a branch structure in a part thereof.

$R^2$ and $R^3$ each independently represent an alkyl group having 1 to 20 carbon atoms, or an aryl group having 6 to 20 carbon atoms, and may have a branch structure in a part thereof.

Each of $R^1$ to $R^3$, if present in a plural number, is respectively independent.

$X^1$ represents an independent halogen atom.

m represents an integer of 0 to 2, n represents an integer of 0 to 3, l represents an integer of 0 to 3, and (m+n+l) is 3.

In formula (2), $R^2$ to $R^5$ each independently represent an alkyl group having 1 to 20 carbon atoms or an aryl group having 6 to 20 carbon atoms, and may have a branch structure in a part thereof.

Each of $R^2$ to $R^5$, if present in a plural number, is respectively independent.

$X^2$ and $X^3$ represent an independent halogen atom.

m represents an integer of 0 to 2, n represents an integer of 0 to 3, l represents an integer of 0 to 3, and (m+n+l) is 3.

a represents an integer of 0 to 2, b represents an integer of 0 to 3, c represents an integer of 0 to 3, and (a+b+c) is 3.

From the viewpoints of continuity of polymerization and improvement of the branch number, the branching agent used in constructing the main chain branch structure of the conjugated diene-based polymer (A) is preferably a compound represented by formula (1) in which $R^1$ is a hydrogen atom and m is 0.

Alternatively, from the viewpoint of improvement of the branch number, the branching agent used in constructing the main chain branch structure of the conjugated diene-based polymer (A) is preferably a compound represented by formula (2) in which m is 0 and b is 0.

From the viewpoints of continuity of polymerization and improvement of the modification ratio and the branch number, the branching agent used in constructing the main chain branch structure of the conjugated diene-based polymer (A) is more preferably a compound represented by formula (1) in which $R^1$ is a hydrogen atom, m is 0, and l is 0.

From the viewpoint of improvement of the modification ratio and the branch number, the branching agent used in constructing the main chain branch structure of the conjugated diene-based polymer (A) is further preferably a compound represented by formula (2) in which m is 0, l is 0, a is 0, and b is 0.

From the viewpoints of continuity of polymerization and improvement of the modification ratio and the branch number, the branching agent used in constructing a main chain branch structure of the conjugated diene-based polymer (A) is more preferably a compound represented by formula (1) in which $R^1$ is a hydrogen atom, l is 0, and n is 3.

Examples of the branching agent represented by the formula (1) include, but are not limited to, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, trimethoxy(2-vinylphenyl)silane, triethoxy(2-vinylphenyl)silane, tripropoxy(2-vinylphenyl)silane, tributoxy(2-vinylphenyl)silane, triisopropoxy(2-vinylphenyl)silane, dimethoxymethyl(4-vinylphenyl)silane, diethoxymethyl(4-vinylphenyl)silane, dipropoxymethyl(4-vinylphenyl)silane, dibutoxymethyl(4-vinylphenyl)silane, diisopropoxymethyl(4-vinylphenyl)silane, dimethoxymethyl(3-vinylphenyl)silane, diethoxymethyl(3-vinylphenyl)silane, dipropoxymethyl(3-vinylphenyl)silane, dibutoxymethyl(3-vinylphenyl)silane, diisopropoxymethyl(3-vinylphenyl)silane, dimethoxymethyl(2-vinylphenyl)silane, diethoxymethyl(2-vinylphenyl)silane, dipropoxymethyl(2-vinylphenyl)silane, dibutoxymethyl(2-vinylphenyl)silane, diisopropoxymethyl(2-vinylphenyl)silane, dimethylmethoxy(4-vinylphenyl)silane, dimethylethoxy(4-vinylphenyl)silane, dimethylpropoxy(4-vinylphenyl)silane, dimethylbutoxy(4-vinylphenyl)silane, dimethylisopropoxy(4-vinylphenyl)silane, dimethylmethoxy(3-vinylphenyl)silane, dimethylethoxy(3-vinylphenyl)silane, dimethylpropoxy(3-vinylphenyl)silane, dimethylbutoxy(3-vinylphenyl)silane, dimethylisopropoxy(3-vinylphenyl)silane, dimethylmethoxy(2-vinylphenyl)silane, dimethylethoxy(2-vinylphenyl)silane, dimethylpropoxy(2-vinylphenyl)silane, dimethylbutoxy(2-vinylphenyl)silane, and dimethylisopropoxy(2-vinylphenyl)silane.

Other examples of the branching agent represented by the formula (1) include trimethoxy(4-isopropenylphenyl)silane, triethoxy(4-isopropenylphenyl)silane, tripropoxy(4-isopropenylphenyl)silane, tributoxy(4-isopropenylphenyl)silane, triisopropoxy(4-isopropenylphenyl)silane, trimethoxy(3-isopropenylphenyl)silane, triethoxy(3-isopropenylphenyl)silane, tripropoxy(3-isopropenylphenyl)silane, tributoxy(3-isopropenylphenyl)silane, triisopropoxy(3-isopropenylphenyl)silane, trimethoxy(2-isopropenylphenyl)silane, triethoxy(2-isopropenylphenyl)silane, tripropoxy(2-isopropenylphenyl)silane, tributoxy(2-isopropenylphenyl)silane, triisopropoxy(2-isopropenylphenyl)silane, dimethoxymethyl(4-isopropenylphenyl)silane, diethoxymethyl(4-isopropenylphenyl)silane, dipropoxymethyl(4-isopropenylphenyl)silane, dibutoxymethyl(4-isopropenylphenyl)silane, diisopropoxymethyl(4-isopropenylphenyl)silane, dimethoxymethyl(3-isopropenylphenyl)silane, diethoxymethyl(3-isopropenylphenyl)silane, dipropoxymethyl(3-isopropenylphenyl)silane, dibutoxymethyl(3-isopropenylphenyl)silane, diisopropoxymethyl(3-isopropenylphenyl)silane, dimethoxymethyl(2-isopropenylphenyl)silane, diethoxymethyl(2-isopropenylphenyl)silane, dipropoxymethyl(2-isopropenylphenyl)silane, dibutoxymethyl(2-isopropenylphenyl) silane, diisopropoxymethyl (2-isopropenylphenyl) silane, dimethylmethoxy(4-isopropenylphenyl)silane, dimethylethoxy(4-isopropenylphenyl)silane, dimethylpropoxy(4-isopropenylphenyl)silane, dimethylbutoxy(4-isopropenylphenyl)silane, dimethylisopropoxy(4-isopropenylphenyl)silane, dimethylmethoxy(3-isopropenylphenyl)silane, dimethylethoxy(3-isopropenylphenyl)silane, dimethylpropoxy(3-isopropenylphenyl)silane, dimethylbutoxy(3-isopropenylphenyl)silane, dimethylisopropoxy(3-isopropenylphenyl)silane, dimethylmethoxy(2-isopropenylphenyl)silane, dimethylethoxy(2-isopropenylphenyl)silane, dimethylpropoxy(2-isopropenylphenyl)silane, dimethylbutoxy(2-isopropenylphenyl) silane, dimethylisopropoxy(2-isopropenylphenyl)silane, trichloro(4-vinylphenyl)silane, trichloro(3-vinylphenyl)silane, trichloro(2-vinylphenyl)silane, tribromo(4-vinylphenyl)silane, tribromo(3-vinylphenyl)silane, tribromo(2-vinylphenyl)silane, dichloromethyl(4-vinylphenyl)silane, dichloromethyl(3-vinylphenyl)silane, dichloromethyl(2-vinylphenyl)silane, dibromomethyl(4-vinylphenyl)silane, dibromomethyl(3-vinylphenyl)silane, dibromomethyl(2-vinylphenyl)silane, dimethylchloro(4-vinylphenyl)silane, dimethylchloro(3-vinylphenyl)silane, dimethylchloro(2-vinylphenyl)silane, dimethylbromo(4-vinylphenyl)silane, dimethylbromo(3-vinylphenyl)silane, and dimethylbromo(2-vinylphenyl)silane.

Among these, trimethoxy(4-vinylphenyl)silane, triethoxy(4-vinylphenyl)silane, tripropoxy(4-vinylphenyl)silane, tributoxy(4-vinylphenyl)silane, triisopropoxy(4-vinylphenyl)silane, trimethoxy(3-vinylphenyl)silane, triethoxy(3-vinylphenyl)silane, tripropoxy(3-vinylphenyl)silane, tributoxy(3-vinylphenyl)silane, triisopropoxy(3-vinylphenyl)silane, and trichloro(4-vinylphenyl)silane are preferred, and trimethoxy(4-vinylphenyl)silane, triethoxy(4-vinylphenyl)silane, tripropoxy(4-vinylphenyl)silane, tributoxy(4-vinylphenyl)silane, and triisopropoxy(4-vinylphenyl)silane are more preferred.

Examples of the branching agent represented by formula (2) include, but are not limited to, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, 1,1-bis(4-triisopropoxysilylphenyl)ethylene, 1,1-bis(3-trimethoxysilylphenyl)ethylene, 1,1-bis(3-triethoxysilylphenyl)ethylene, 1,1-bis(3-tripropoxysilylphenyl)ethylene, 1,1-bis(3-tripentoxysilylphenyl)ethylene, 1,1-bis(3-triisopropoxysilylphenyl)ethylene, 1,1-bis(2-trimethoxysilylphenyl)ethylene, 1,1-bis(2-triethoxysilylphenyl)ethylene, 1,1-bis(3-tripropoxysilylphenyl)ethylene, 1,1-bis(2-tripentoxysilylphenyl)ethylene, 1,1-bis(2-triisopropoxysilylphenyl)ethylene, 1,1-bis(4-(dimethylmethoxysilyl)phenyl)ethylene, 1,1-bis(4-(diethylmethoxysilyl)phenyl)ethylene, 1,1-bis(4-(dipropylmethoxysilyl)phenyl)ethylene, 1,1-bis(4-(dimethylethoxysilyl)phenyl)ethylene, 1,1-bis(4-(diethylethoxysilyl)phenyl)ethylene, and 1,1-bis(4-(dipropylethoxysilyl)phenyl)ethylene.

Among these, 1,1-bis(4-trimethoxysilylphenyl)ethylene, 1,1-bis(4-triethoxysilylphenyl)ethylene, 1,1-bis(4-tripropoxysilylphenyl)ethylene, 1,1-bis(4-tripentoxysilylphenyl)ethylene, and 1,1-bis(4-triisopropoxysilylphenyl)ethylene are preferred, and 1,1-bis(4-trimethoxysilylphenyl)ethylene is more preferred.

(Production Method for Conjugated Diene-Based Polymer (A))

A production method for a conjugated diene-based polymer (A) includes a polymerizing/branching step of polymerizing at least a conjugated diene compound in the presence of an organic lithium-based compound to obtain a conjugated diene-based polymer having a main chain branch structure by using at least any one of the various branching agents described above; and a step of coupling the conjugated diene-based polymer by using a coupling agent and/or a reaction step of modifying the conjugated diene-based polymer with a modifier having a nitrogen atom-containing group.

The conjugated diene-based polymer contained in a modified conjugated diene-based polymer may be any one of a homopolymer of a single conjugated diene compound, a polymer, namely, a copolymer, of different kinds of conjugated diene compounds, and a copolymer of a conjugated diene compound and an aromatic vinyl compound.

<Polymerizing/Branching Step>

In the polymerizing/branching step in the production method for a conjugated diene-based polymer (A), an organic lithium-based compound, such as an organomonolithium compound, is used as a polymerization initiator to polymerize at least a conjugated diene compound, and a branching agent is added thereto to obtain a conjugated diene-based polymer having a main chain branch structure.

In the polymerizing step, the polymerization is performed preferably by a growth reaction by a living anionic polymerization reaction, and thus, a conjugated diene-based polymer having an active end can be obtained. Thereafter, also in the branching step using a branching agent, main chain branching can be appropriately controlled, and there is a tendency that a modified conjugated diene-based polymer having a high modification ratio can be obtained by continuing the polymerization on the active end after the main chain branching.

[Polymerization Initiator]

As a polymerization initiator, an organic lithium-based compound is used, and at least an organomonolithium compound is preferably used.

An example of the organomonolithium compound includes, but is not limited to, an organomonolithium compound of a low molecular weight compound or a soluble oligomer.

Examples of the organomonolithium compound include, with respect to a bonding mode between an organic group and lithium thereof, a compound having a carbon-lithium bond, a compound having a nitrogen-lithium bond, and a compound having a tin-lithium bond.

An amount of the organomonolithium compound to be used as the polymerization initiator is preferably determined on the basis of the molecular weight of a target conjugated diene-based polymer.

A ratio of the amount of a monomer such as a conjugated diene compound to be used to the amount of the polymerization initiator to be used relates to the degree of polymerization of the target conjugated diene-based polymer. In other words, there is a tendency that it relates to the number average molecular weight and/or the weight average molecular weight.

Accordingly, in order to increase the molecular weight of the conjugated diene-based polymer, adjustment may be made to reduce the amount of the polymerization initiator, and in order to reduce the molecular weight, the adjustment may be made to increase the amount of the polymerization initiator.

From the viewpoint that it is used as one method for introducing a nitrogen atom into a conjugated diene-based polymer, the organomonolithium compound is preferably an alkyl lithium compound having a substituted amino group or dialkylamino lithium.

In this case, a conjugated diene-based polymer having, at a polymerization starting end, a nitrogen atom of an amino group is obtained.

The substituted amino group refers to an amino group having no active hydrogen or having a structure in which active hydrogen is protected.

Examples of an alkyl lithium compound containing an amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium.

Examples of an alkyl lithium compound containing an amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane, and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of an oligomer soluble in normal hexane or cyclohexane.

From the viewpoint of the industrial availability and the controllability of the polymerization reaction, the organomonolithium compound is preferably an alkyl lithium compound. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium, and stilbene lithium.

From the viewpoint of the industrial availability and the controllability of the polymerization reaction, the alkyl lithium compound is preferably n-butyllithium or sec-butyllithium.

One of these organomonolithium compounds may be singly used, or two or more of these may be used together. Alternatively, another organic metal compound may be used together.

Examples of such another organic metal compound include alkaline earth metal compounds, other alkaline metal compounds, and other organic metal compounds.

Examples of the alkaline earth metal compounds include, but are not limited to, organic magnesium compounds, organic calcium compounds and organic strontium compounds. Other examples include compounds of alkoxides, sulfonates, carbonates and amides of alkaline earth metals.

Examples of the organic magnesium compounds include dibutyl magnesium and ethyl butyl magnesium. Examples of the other organic metal compounds include organic aluminum compounds.

Examples of a polymerization reaction mode employed in the polymerizing step include, but are not limited to, batch and continuous polymerization reaction modes.

In the continuous mode, one reactor or two or more connected reactors can be used. As a reactor for the continuous mode, for example, a tank or tubular reactor equipped with a stirrer can be used. In the continuous mode, a monomer, an inert solvent and a polymerization initiator are continuously fed to the reactor, a polymer solution containing a polymer is obtained in the reactor, and the polymer solution is continuously discharged.

As a reactor for the batch mode, for example, a tank reactor equipped with a stirrer is used. It is preferable, in the batch mode, that a monomer, an inert solvent and a polymerization initiator are fed to the reactor, the monomer is continuously or intermittently additionally fed if necessary during the polymerization, a polymer solution containing a polymer is obtained in the reactor, and the polymer solution is discharged after completing the polymerization.

In the production method for a conjugated diene-based polymer (A), in order to obtain a conjugated diene-based polymer having an active end at a high ratio, the continuous mode in which a polymer is continuously discharged to be supplied to a next reaction in a short period of time is preferably employed.

In the polymerizing step for a conjugated diene-based polymer, the polymerization is performed preferably in an inert solvent.

Examples of the inert solvent include hydrocarbon-based solvents such as saturated hydrocarbons and aromatic hydrocarbons. Specific examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon containing a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerizing step, a polar compound (herein referred to as a polar material in some cases) may be added. Thus, an aromatic vinyl compound can be randomly copolymerized with a conjugated diene compound, and there is a tendency that the polar compound can be used also as a vinylation agent for controlling a microstructure of a conjugated diene portion. Besides, it tends to be advantageous for, for example, acceleration of the polymerization reaction.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkaline metal alkoxide compounds such as potassium-tert-amylate, potassium-tert-butylate, sodium-tert-butylate, and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mole of the polymerization initiator.

Such a polar compound (a vinylation agent) can be used, as a microstructure modifier for a conjugated diene portion of the conjugated diene-based polymer, in an appropriate amount in accordance with a desired amount of bound vinyl.

There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block.

As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

In the polymerizing step, a polymerization temperature is preferably a temperature at which the living anionic polymerization proceeds, and from the viewpoint of productivity, is more preferably 0° C. or more, and more preferably 120° C. or less. If the polymerization temperature falls in this range, there is a tendency that a reaction amount of the modifier reacted to the active end can be sufficiently attained after completing the polymerization. The polymerization temperature is further preferably 50° C. or more and 100° C. or less.

In the production method for a conjugated diene-based polymer (A), the amount of the branching agent to be added in the branching step for forming a main chain branch structure is not especially limited but can be selected in accordance with the purpose or the like, and is preferably 0.03 mol or more and 0.5 mol or less, more preferably 0.05 mol or more and 0.4 mol or less, and further preferably 0.01 mol or more and 0.25 mol or less per mole of the polymerization initiator.

The branching agent can be used in an amount selected in accordance with the number of branch points of a main chain branch structure of the conjugated diene portion of the target conjugated diene-based polymer (A).

The timing of adding the branching agent in the branching step is not especially limited but can be selected in accordance with the purpose or the like, and from the viewpoints of the improvement of the absolute molecular weight of the conjugated diene-based polymer (A) and the improvement of the modification ratio, is timing, after adding the polymerization initiator, when a raw material conversion rate is preferably 20% or more, more preferably 40% or more, further preferably 50% or more, still further preferably 65% or more, and much further preferably 75% or more.

After the addition of the branching agent, a desired raw material may be additionally added to continue the polymerizing step after the branching, or the above-described process may be repeated.

A monomer to be additionally added is not especially limited, and from the viewpoint of the improvement of the modification ratio of the conjugated diene-based polymer, is preferably 5% or more, more preferably 10% or more, further preferably 15% or more, still further preferably 20% or more, and much further preferably 25% or more based on the total amount of conjugated diene-based monomers, for example, the total amount of butadiene, used in the polymerizing step.

The conjugated diene-based polymer obtained, prior to the modification reaction step, by the polymerizing/branching step in the production method for a conjugated diene-based polymer (A) has a Mooney viscosity, measured at 110° C., of preferably 10 or more and 150 or less, more preferably 15 or more and 140 or less, and further preferably 20 or more and 130 or less.

If the Mooney viscosity falls in this range, the conjugated diene-based polymer composition of the present embodiment tends to be excellent in processability and abrasion resistance.

The conjugated diene-based polymer (A) contained in the conjugated diene-based polymer composition of the present embodiment is a polymer containing a conjugated diene-based polymer, may be a polymer of a conjugated diene monomer, an aromatic vinyl monomer, and a branching agent, or may be a copolymer of a conjugated diene monomer, an aromatic vinyl monomer, a branching agent, and another monomer.

For example, when the conjugated diene monomer is butadiene or isoprene, and this diene monomer is polymerized with a branching agent containing an aromatic vinyl portion, a polymer chain is what is called polybutadiene or polyisoprene, and a polymer containing a structure derived from an aromatic vinyl in a branched portion is obtained. Owing to such a structure, linearity of each polymer chain can be improved and a crosslink density obtained after vulcanization can be improved, resulting in obtaining an effect of improving the abrasion resistance of the polymer. Therefore, such a polymer is suitably used for a tire, resin modification, interior/exterior of a vehicle, an anti-vibration rubber, shoes and the like.

When the conjugated diene-based polymer is used in application to a tire tread, a copolymer of a conjugated diene monomer, an aromatic vinyl monomer, and a branching agent is suitably used, and in the copolymer used in this application, the amount of bound conjugated diene is preferably 40% by mass or more and 100% by mass or less, and more preferably 55% by mass or more and 80% by mass or less.

Besides, the amount of bound aromatic vinyl in the conjugated diene-based polymer (A) is not especially limited, and is preferably 0% by mass or more and 60% by mass or less, and more preferably 20% by mass or more and 45% by mass or less.

When the amounts of bound conjugated diene and bound aromatic vinyl fall in the above-described ranges, the balance between a low hysteresis loss property and wet grip performance, abrasion resistance and fracture performance obtained when in the form of a vulcanizate tend to be more excellent.

Here, the amount of bound aromatic vinyl can be measured in accordance with UV absorption by a phenyl group, and based on the thus obtained amount, the amount of bound conjugated diene can be also obtained. Specifically, these amounts are measured in accordance with a method described later in the examples.

In the conjugated diene-based polymer (A), the amount of bound vinyl in a conjugated diene monomer unit derived from a conjugated diene compound is not especially limited, and is preferably 10% by mol or more and 75% by mol or less, and more preferably 20% by mol or more and 65% by mol or less.

If the amount of bound vinyl falls in the above-described range, the balance between a low hysteresis loss property and wet grip performance, abrasion resistance, and fracture strength obtained when in the form of a vulcanizate tend to be more excellent.

Here, if the conjugated diene-based polymer (A) is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the conjugated diene-based polymer (A), if the amounts of the aforementioned bonds in the conjugated diene-based polymer (A) respectively fall in the above-described ranges and the glass transition temperature of the conjugated diene-based polymer (A) is −20° C. or more, there is a tendency that a vulcanizate more excellent in the balance between a low fuel consumption performance and wet grip performance can be obtained.

The glass transition temperature is defined as a peak top (an inflection point) of a DSC differential curve obtained by recording a DSC curve during temperature increase in a prescribed temperature range in accordance with ISO 22768:2006. Specifically, it can be measured in accordance with a method described in the examples below.

If the conjugated diene-based polymer (A) is a conjugated diene-aromatic vinyl copolymer, it preferably contains a few or no blocks in which 30 or more aromatic vinyl units are chained. More specifically, if the conjugated diene-based polymer (A) is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less with respect to the total amount of the conjugated diene-based polymer.

From the viewpoint of improving fuel efficiency, if the conjugated diene-based polymer (A) is a conjugated diene-aromatic vinyl copolymer, a larger proportion of an aromatic vinyl unit is preferably present singly.

Specifically, if the conjugated diene-based polymer (A) is a butadiene-styrene copolymer, when the conjugated diene-based polymer is decomposed by employing a method through ozonolysis known as a method of Tanaka et al., (Polymer, 22, 1721 (1981)) to analyze a styrene chain distribution by GPC, it is preferable that the amount of isolated styrene, with respect to the whole amount of bound styrene, is 40% by mass or more, and that the amount of a chain styrene structure consisting of 8 or more chained styrene is 5.0% by mass or less.

In this case, a hysteresis loss can be effectively reduced in a resultant vulcanized rubber.

<Reaction Step>

In the production method for a conjugated diene-based polymer (A), a step of coupling an active end of the conjugated diene-based polymer obtained through the polymerizing/branching step with a coupling agent, such as a tri- or higher functional reactive compound and/or a step of modifying it with a modifier containing a nitrogen atom-containing group (preferably a coupling agent containing a nitrogen atom-containing group) are performed.

Hereinafter, the step of coupling and/or the step of modifying the active end will be referred to as a reaction step.

In the reaction step, one end of the active end of the conjugated diene-based polymer is reacted with a coupling agent or a modifier having a nitrogen atom-containing group, and thus, a coupled or modified conjugated diene-based polymer is obtained.

[Coupling Agent]

The coupling agent used in the reaction step of the production method for a conjugated diene-based polymer (A) may have any structure as long as it is a tri- or higher functional reactive compound, and is preferably a tri- or higher functional reactive compound having a silicon atom, and more preferably one having at least 4 silicon-containing functional groups. A more preferable coupling agent is a compound in which at least one silicon atom constitutes an alkoxysilyl group or silanol group having 1 to 20 carbon atoms. Examples of such a coupling agent include tetramethoxysilane and tetraethoxysilane.

[Modifier]

Examples of the modifier include, but are not limited to, tris(3-trimethoxysilylpropyl)amine, tris(3-triethoxysilylpropyl)amine, tris(3-tripropoxysilylpropyl)amine, bis(3-trimethoxysilylpropyl)-[3-(2,2-dimethoxy-1-aza-2-silacyclopentane)propyl]amine, tetrakis(3-trimethoxysilylpropyl)-1,3-propanediamine, tris(3-trimethoxysilylpropyl)-[3-(1-methoxy-2-trimethylsilyl-1-sila-2-azacyclopentane)propyl]-1,3-propanediamine, tris(3-trimethoxysilylpropyl)-[3-(1-methoxy-2-methyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, tetrakis(3-trimethoxysilylpropyl)-1,6-hexamethylenediamine, pentakis(3-trimethoxysilylpropyl)-diethylenetriamine, tris(3-trimethoxysilylpropyl)-methyl-1,3-propanediamine, tetrakis[3-(2,2-dimethoxy-1-aza-2-silacyclopentane)propyl]silane, bis(3-trimethoxysilylpropyl)-bis[3-(2,2-dimethoxy-1-aza-2-silacyclopentane)propyl]silane, tris[3-(2,2- dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-1-trimethylsilyl-1-sila-2-azacyclopentane)propyl]silane, 3-tris[2-(2,2-dimethoxy-1-aza-2-silacyclopentane)ethoxy]silyl-1-trimethoxysilylpropane, 1-[3-(1-methoxy-2-trimethylsilyl-1-sila-2-azacyclopentane)propyl]-3,4,5-tris(3-trimethoxysilylpropyl)-cyclohexane, 1-[3-(2,2-dimethoxy-1-aza-2-silacyclopentane)propyl]-3,4,5-tris(3-trimethoxysilylpropyl)-cyclohexane, 3,4,5-tris(3-trimethoxysilylpropyl)-cyclohexyl-[3-(2,2-dimethoxy-1-aza-2-silacyclopentane)propyl] ether, (3-trimethoxysilylpropyl) phosphate, bis(3-trimethoxysilylpropyl)-[3-(2,2-dimethoxy-1-aza-2-silacyclopentane)propyl] phosphate, bis[3-(2,2-dimethoxy-1-aza-2-silacyclopentane)propyl]-(3-trimethoxysilylpropyl) phosphate, and tris[3-(2,2-dimethoxy-1-aza-2-silacyclopentane)propyl] phosphate.

The modifier preferably contains a compound represented by any one of the following general formulas (A) to (C):

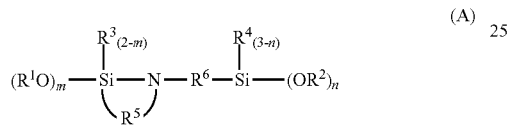

wherein $R^1$ to $R^4$ each independently represent an alkyl group having 1 to 20 carbon atoms or an aryl group having 6 to 20 carbon atoms, $R^5$ represents an alkylene group having 1 to 10 carbon atoms, $R^6$ represents an alkylene group having 1 to 20 carbon atoms, m represents an integer of 1 or 2, n represents an integer of 2 or 3, (m+n) is an integer of 4 or more, and each of $R^1$ to $R^4$, if present in a plural number, is respectively independent.

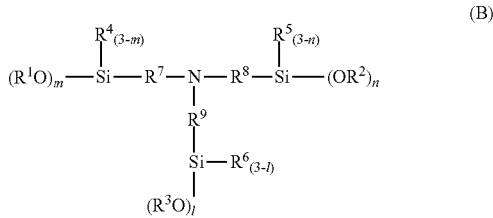

wherein $R^1$ to $R^6$ each independently represent an alkyl group having 1 to 20 carbon atoms or an aryl group having 6 to 20 carbon atoms, $R^7$ to $R^9$ each independently represent an alkylene group having 1 to 20 carbon atoms, m, n, and l each independently represent an integer of 1 to 3, (m+n+l) is an integer of 4 or more, and each of $R^1$ to $R^6$, if present in a plural number, is respectively independent.

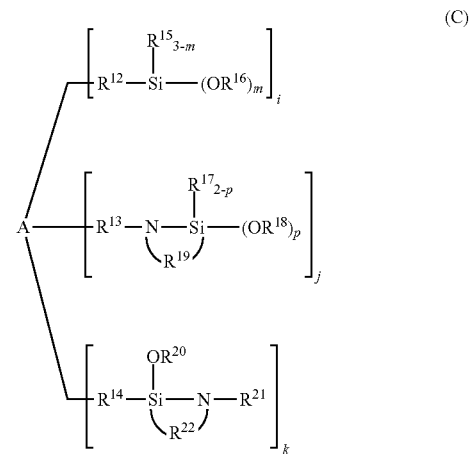

wherein $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, $R^{21}$ represents an alkyl group or a trialkyl silyl group having 1 to 20 carbon atoms, m represents an integer of 1 to 3, p represents 1 or 2, each of $R^{12}$ to $R^{22}$, m and p, if present in a plural number, is respectively independent, and may be the same or different, i represents an integer of 0 to 6, j represents an integer of 0 to 6, k represents an integer of 0 to 6, (i+j+k) is an integer of 4 to 10, and A represents a hydrocarbon group having 1 to 20 carbon atoms, or an organic group having at least one atom selected from the group consisting of an oxygen atom, a nitrogen atom, a silicon atom, a sulfur atom, and a phosphorus atom, and not having active hydrogen.

Examples of the modifier represented by formula (A) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-1-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

Among these, from the viewpoint of reactivity and interactivity between a functional group of the modifier and an inorganic filler such as silica, and from the viewpoint of processability, it is preferable that m is 2 and that n is 3. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The reaction temperature, the reaction time and the like in causing the modifier represented by formula (A) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by formula (A) is preferably 0.6 or more times and 3.0 or less times, more preferably 0.8 or more times and 2.5 or less times, and further preferably 0.8 or more times and 2.0 or less times of a mole number of an alkaline metal compound and/or an alkaline earth metal compound of a polymerization initiator to be added. From the viewpoint that the thus obtained modified conjugated diene-based polymer has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

More specific mole number of the polymerization initiator is preferably 3.0-fold moles or more, and more preferably 4.0-fold moles or more relative to the mole number of the modifier.

Examples of the modifier represented by formula (B) include, but are not limited to, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine.

Among these, from the viewpoint of reactivity and interactivity between a functional group of the modifier and an inorganic filler such as silica, and from the viewpoint of processability, it is preferable that n, m and 1 are all 3. Specific preferable examples include tris(3-trimethoxysilylpropyl)amine, and tris(3-triethoxysilylpropyl)amine.

The reaction temperature, the reaction time and the like in causing the modifier represented by formula (B) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by formula (B) is preferably 0.6 or more times and 3.0 or less times, more preferably 0.8 or more times and 2.5 or less times, and further preferably 0.8 or more times and 2.0 or less times of a mole number of lithium contained in a polymerization initiator to be added. From the viewpoint that the modified conjugated diene-based polymer has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

More specific mole number of the polymerization initiator is preferably 4.0-fold moles or more, and more preferably 5.0-fold moles or more relative to the mole number of the modifier.

In formula (C), A is preferably represented by any one of the following general formulas (II) to (V):

(II)

wherein $B^1$ represents a single bond or a hydrocarbon group having 1 to 20 carbon atoms, a represents an integer of 1 to 10, and $B^1$, if present in a plural number, is respectively independent;

(III)

wherein $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent;

(IV)

wherein $B^4$ represents a single bond or a hydrocarbon group having 1 to 20 carbon atoms, a represents an integer of 1 to 10, and $B^4$, if present in a plural number, is respectively independent; and

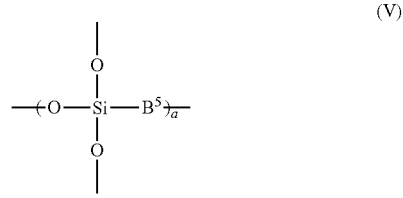
(V)

wherein $B^5$ represents a single bond or a hydrocarbon group having 1 to 20 carbon atoms, a represents an integer of 1 to 10, and $B^5$, if present in a plural number, is respectively independent.

Examples of the modifier represented by the formula (C) wherein A is represented by the formula (II) include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, and bis(3-trimethoxysilylpropyl)-bis[3-(2,2-dimethoxy-1-aza-2-silacyclopentane)propyl]-1,3-propanediamine.

Other examples include tris[3-(2,2-dimethoxy-1-aza-2-silacyclopentane)propyl]-(3-trimethoxysilylpropyl)-1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-

(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, and tris[3-(2,2-diethoxy-1-aza-2-silacyclopentane)propyl]-(3-triethoxysilylpropyl)-1,3-propanediamine.

Still other examples include tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)proypl]-1,3-bisaminomethycyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-biasminomethylcyclohexane, tris[3-(2,2-dimethoxy-1-aza-2-cyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, and bis(3-triethoxysilylpropyl)-bis[3-(2,2-diethoxy-1-aza-2-silacyclopentane)propyl]-1,3-bisaminomethylcyclohexane.

Still other examples include tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine and pentakis(3-trimethoxysilylpropyl)-diethylenetriamine.

Examples of the modifier represented by formula (C) wherein A is represented by formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1''}$-(propane-1,3-diyl)bis($N^1$-methyl-$N^3,N^3$-bis(3-(trimethoxysilyl)propyl)-1,3-propanediamine) and $N^1$-(3-(bis(3-(trimethoxysilyl) propyl)amino) propyl)-$N^1$-methyl-$N^3$-(3-(methyl (3-(trimethoxysilyl) propyl)amino) propyl)-$N^3$-(3-(trimethoxysilyl)propyl)-1,3-propanediamine.

Examples of the modifier represented by formula (C) wherein A is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl] silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl] silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the modifier represented by formula (C) wherein A is represented by formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In formula (C), A is preferably represented by formula (II) or formula (III), and k represents 0 (zero).

Such a modifier tends to be easily available, and tends to make the resultant conjugated diene-based polymer composition of the present embodiment containing the conjugated diene-based polymer (A) more excellent in abrasion resistance and a low hysteresis loss property when in the form of a vulcanizate.

Examples of such a modifier include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)- methyl-1,3-propanediamine, and bis[3-(2,2-dimethoxy-1-aza-2-silacyclopentane)propyl]-(3-trismethoxysilylpropyl)-methyl-1,3-propanediamine.

In formula (C), it is more preferable that A is represented by formula (II) or formula (III), and that k represents 0 (zero) and a represents an integer of 2 to 10 in formula (II) or formula (III).

Thus, abrasion resistance and a low hysteresis loss property when in the form of a vulcanizate tend to be more excellent.

Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl) propyl)amino) propyl)-$N^1$-methyl-$N^3$-(3-(methyl (3-(trimethoxysilyl) propyl)amino) propyl)-$N^3$-(3-(trimethoxysilyl)propyl)-1,3-propanediamine.

The amount of the compound represented by formula (C) to be added as the modifier can be adjusted for causing the modifier to react with the conjugated diene-based polymer in such a manner that a mole number of the modifier relative to a mole number of the conjugated diene-based polymer can be in a desired stoichiometric ratio, and thus, a desired star polymer branch structure tends to be attained.

Specifically, the mole number of the conjugated diene-based polymer is preferably 5.0-fold moles or more, and more preferably 6.0-fold moles or more relative to the mole number of the modifier.

In this case, in formula (C), the number of functional groups ((m−1)× i+p× j+k) of the modifier is preferably an integer of 5 to 10, and more preferably an integer of 6 to 10.

In the production process of the conjugated diene-based polymer (A), a condensation reaction step of performing a condensation reaction in the presence of a condensation accelerator may be performed after the reaction step, or before the reaction step.

The conjugated diene-based polymer (A) may be hydrogenated in the conjugated diene portion thereof.

A method for hydrogenating the conjugated diene portion of the conjugated diene-based polymer (A) is not especially limited, and any of known methods can be employed.

As a suitable hydrogenation method, a method in which the hydrogenation is performed by blowing gaseous hydrogen into the polymer solution in the presence of a catalyst can be employed.

Examples of the catalyst include heterogeneous catalysts such as a catalyst containing a noble metal supported on a porous inorganic substance; and homogeneous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used.

In addition, hydrogenation of an aromatic group can be performed by using a noble metal-supported catalyst.

Examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the method for producing the conjugated diene-based polymer (A), a deactivator, a neutralizer or the like may be added if necessary to the resultant polymer solution after the reaction step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the conjugated diene-based polymer (A), from the viewpoint of preventing gel formation after the polymerization and of improving stability in the processing, a stabilizer for rubber is preferably added.

As the stabilizer for rubber, any of known stabilizers, not limited to the following, can be used, and preferable examples include antioxidants such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

<Extended Conjugated Diene-Based Polymer>

The conjugated diene-based polymer (A) may be obtained as an extended conjugated diene-based polymer by causing the conjugated diene-based polymer obtained through the above-described production process to contain at least any one selected from the group consisting of an extender oil, a liquid rubber, and a resin.

It is noted that the extended conjugated diene-based polymer encompasses not only an extended conjugated diene-based polymer containing an oil but also one containing a liquid polybutadiene excluding an oil, or any of various resins.

Thus, the processability of the conjugated diene-based polymer can be further improved.

A preferable example of a method for adding an extender oil to the conjugated diene-based polymer includes, but is not limited to, a method in which an extender oil is added to a conjugated diene-based polymer solution to be mixed, and the resultant extended polymer solution is desolvated.

Examples of the extender oil include an aroma oil, a naphthenic oil and a paraffin oil. Among these, from the viewpoints of environmental safety, oil bleeding prevention and wet performance, an aroma-alternative oil containing 3% by mass or less of a polycyclic aromatic (PCA) component according to the IP 346 is preferred. Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

Examples of the liquid rubber include, but are not limited to, liquid polybutadiene and liquid styrene-butadiene rubber.

Examples of the resin include, but are not limited to, an aromatic petroleum resin, a coumarone-indene resin, a terpene-based resin, a rosin derivative (including a wood oil resin), tall oil, a derivative of tall oil, a rosin ester resin, a natural or synthetic terpene resin, an aliphatic hydrocarbon resin, an aromatic hydrocarbon resin, a mixed aliphatic/aromatic hydrocarbon resin, a coumarin-indene resin, a phenol resin, a p-tert-butylphenol-acetylene resin, a phenol-formaldehyde resin, a xylene-formaldehyde resin, a monoolefin oligomer, a diolefin oligomer, a hydrogenated aromatic hydrocarbon resin, a cyclic aliphatic hydrocarbon resin, a hydrogenated hydrocarbon resin, a hydrocarbon resin, a hydrogenated wood oil resin, a hydrogenated oil resin, and an ester of a hydrogenated oil resin and a monofunctional or polyfunctional alcohol.

One of these resins may be singly used, or two or more of these may be used together. When hydrogenated, all unsaturated groups may be hydrogenated, or some may be left not hydrogenated.

The amount to be added of at least any one selected from the group consisting of an extender oil, a liquid rubber and a resin is not limited, and is preferably 1 to 60 parts by mass, more preferably 5 to 60 parts by mass, and further preferably 10 to 37.5 parts by mass with respect to 100 parts by mass of the conjugated diene-based polymer.

<Desolvation Step>

As a method for obtaining the conjugated diene-based polymer (A) from the polymer solution, any of know methods can be employed. Examples of the method include a method in which the conjugated diene-based polymer is filtered after separating the solvent by steam stripping or the like, and the resultant is dehydrated and dried to obtain the conjugated diene-based polymer, a method in which the solution is concentrated in a flushing tank, and the resultant is devolatilized by using a bent extruder or the like, and a method in which the solution is directly devolatilized by using a drum dryer or the like.

(Composition of Conjugated Diene-Based Polymer Composition)

The conjugated diene-based polymer composition of the present embodiment contains 10 to 90 parts by mass of the above-described conjugated diene-based polymer (A) having a glass transition temperature of −20° C. or more, and 10 to 90 parts by mass of the modified conjugated diene-based polymer (B) having a glass transition temperature of −25° C. or less described below, and preferably further contains 0.5 parts by mass or more and 30 parts by mass or less of a thermoplastic resin with respect to 100 parts by mass of a total amount of the conjugated diene-based polymers (A) and (B).

(Conjugated Diene-Based Polymer (B))

The conjugated diene-based polymer composition of the present embodiment contains 10 to 90 parts by mass of the above-described conjugated diene-based polymer (A), and 10 to 90 parts by mass of the conjugated diene-based polymer (B) having a glass transition temperature of −25° C. or less.

When the conjugated diene-based polymer (B) is contained, abrasion resistance obtained when in the form of a vulcanizate tends to be excellent.

In the conjugated diene-based polymer composition of the present embodiment, from the viewpoint of improvement of abrasion resistance, the glass transition temperature of the conjugated diene-based polymer (B) is preferably −35° C. or less, more preferably −45° C. or less, and further preferably −55° C. or less.

A method for controlling the glass transition temperature of the conjugated diene-based polymer (B) is not especially limited, and when it is to be set to, for example, −35° C. or less, the glass transition temperature can be controlled to fall in this range by setting the amount of an aromatic vinyl compound to 5 to 30% by mass and the amount of a vinyl compound in the conjugated diene-based polymer to 10 to 70% by mass. When it is desired to be set to −55° C. or less, the glass transition temperature can be controlled to fall in this range by setting the amount of an aromatic vinyl compound to 5 to 20% by mass and the amount of a vinyl compound in the conjugated diene-based polymer to 10 to 40% by mass.

With respect to the glass transition temperature, a peak top (an inflection point) of a DSC differential curve obtained by recording a DSC curve during temperature increase in a prescribed temperature range in accordance with ISO 22768: 2006 is defined as the glass transition temperature. Specifically, the glass transition temperature can be measured in accordance with a method described in the examples below.

From the viewpoint of reducing rolling resistance, the conjugated diene-based polymer composition of the present embodiment contains the conjugated diene-based polymer (B) in an amount preferably 20 parts by mass or more, and more preferably 30 parts by mass or more.

From the viewpoint of improvement of grip performance on a wet road surface, the amount is preferably 80 parts by mass or less, and more preferably 70 parts by mass or less.

A lower limit of the glass transition temperature of the conjugated diene-based polymer (B) is not especially limited, and is preferably −90° C. or more. If the glass transition temperature is −90° C. or more, wet grip performance tends to be excellent.

A conjugated diene compound used as a raw material of the conjugated diene-based polymer (B) is not especially limited as long as it is a polymerizable conjugated diene-based compound, and examples include 1,3-butadiene, isoprene, 2,3-dimethyl-1,3-butadiene, 1,3-pentadiene, 3-methyl-1,3-pentadiene, 1,3-heptadiene, and 1,3-hexadiene. Among these, from the viewpoint of industrial availability, 1,3-butadiene and isoprene are preferred. Merely one of these may be singly used, or two or more of these may be used together.

If allenes, acetylenes and the like are contained as impurities in the conjugated diene-based polymer (B), it is apprehended that a modification reaction of a polymer end may be inhibited. Therefore, a total content concentration (mass) of these impurities is preferably 300 ppm or less, more preferably 200 ppm or less, and further preferably 100 ppm or less in some cases.

Examples of allenes include propadiene, and 1,2-butadiene. Examples of acetylenes include ethyl acetylene, and vinyl acetylene.

The conjugated diene-based polymer (B) may be a copolymer of the conjugated diene compound and an aromatic vinyl compound.

The aromatic vinyl compound may be a monomer copolymerizable with the conjugated diene compound, and is not especially limited, and examples include styrene, m- or p-methylstyrene, α-methylstyrene, vinylxylene, vinylnaphthalene, diphenylethylene, and divinylbenzene. Among these, from the viewpoint of industrial availability, styrene is preferred. One of these may be singly used, or two or more of these may be used together.

If the conjugated diene-based polymer (B) is a copolymer, it may be a random copolymer or a block copolymer.

Examples of the random copolymer include a butadiene-isoprene random copolymer, a butadiene-styrene random copolymer, an isoprene-styrene random copolymer, and a butadiene-isoprene-styrene random copolymer. A composition distribution of respective monomers in the copolymer is not especially limited, and examples include a completely random copolymer approximate to a statistically random composition, and a tapered (gradient) random copolymer having a gradient composition distribution. A bonding mode of conjugated diene, namely, the composition of 1,4-bond, 1,2-bond or the like, may be uniform or different among molecular chains.

Examples of the block copolymer include a two-type block copolymer consisting of 2 blocks, a three-type block copolymer consisting of 3 blocks, and a four-type block copolymer consisting of 4 blocks. Here, assuming that a block containing an aromatic vinyl compound such as styrene is indicated by S and that a block containing a conjugated diene-based compound such as butadiene or isoprene and/or a block containing a copolymer of an aromatic vinyl compound and a conjugated diene-based compound is indicated by B, these block copolymers are expressed as an S-B two-type block copolymer, an S-B-S three-type block copolymer, an S-B-S-B four-type block copolymer, and the like.

In each of the block copolymers expressed as above, a boundary between blocks needs not be always clearly distinguished. For example, if a block B is a copolymer of an aromatic vinyl compound and a conjugated diene-based compound, the aromatic vinyl compound may be uniformly distributed, or distributed in a tapered manner in the block B. Alternatively, the block B may include, each in a plural number, a portion where the aromatic vinyl compound is uniformly distributed and/or a portion where it is distributed in a tapered manner. Alternatively, the block B may include a plurality of segments having different contents of the aromatic vinyl compound. If the copolymer contains a plurality of blocks S and blocks B, the structures, such as the molecular weights and the compositions, of the plural blocks may be the same as or different from one another.

A polymerization initiator to be used for polymerizing the conjugated diene-based compound, or polymerizing the conjugated diene-based compound and the aromatic vinyl compound is not especially limited as long as it is an anionic polymerization initiator, and from the viewpoints of stability and handleability, an alkyl compound of a metal such as aluminum, magnesium, lithium, sodium, or potassium is preferred, and among these, organic lithium is particularly preferred from the viewpoint of polymerization efficiency.

An example of the organic lithium to be used as the polymerization initiator includes organic lithium of a low molecular weight compound or soluble oligomer, and other examples include, with respect to a bonding mode between an organic group and lithium, a compound having a carbon-lithium bond, a compound having a nitrogen-lithium bond, and a compound having a tin-lithium bond.

Examples of organic lithium having a carbon-lithium bond include n-butyllithium, sec-butyllithium, tert-butyllithium, n-hexyllithium, benzyllithium, phenyllithium, and stilbene lithium.

Examples of organic lithium having a nitrogen-lithium bond include lithium dimethylamide, lithium diethylamide, lithium dipropylamide, lithium di-n-hexylamide, lithium diisopropylamide, lithium hexamethyleneimide, lithium pyrrolidide, lithium piperidide, lithium heptamethyleneimide, and lithium morpholide.

As the organic lithium, not only the above-described mono organic lithium but also polyfunctional organic lithium may be used, or mono organic lithium and polyfunctional organic lithium may be used together to be polymerized.

Examples of the polyfunctional organic lithium include 1,4-dilithiobutane, a reaction product of sec-butyllithium and diisopropenylbenzene, 1,3,5-trilithiobenzene, a reaction product of n-butyllithium, 1,3-butadiene and divinylbenzene, and a reaction product of n-butyllithium and a polyacetylene compound. Alternatively, organic lithium disclosed in U.S. Pat. No. 5,708,092, U.K. Patent No. 2,241,239, U.S. Pat. No. 5,527,753 and the like can be used. From the viewpoints of industrial availability and controllability of a polymerization reaction, the organic lithium is preferably n-butyllithium or sec-butyllithium.

One of these organic lithium may be singly used, or a mixture of two or more of these may be used.

When organic lithium is actually used as the polymerization initiator, in order to improve the handleability and dispersibility in a polymer solution, a solution thereof obtained by dissolution in a hydrocarbon solvent is preferably used.

Examples of the hydrocarbon solvent include a C4-C8 hydrocarbon solvent, toluene, and xylene, and the hydrocarbon solvent may be cyclic, or may include an unsaturated bond or a branch structure. Because of handleability in a boiling point and a vapor pressure in production process, a C5-C6 hydrocarbon solvent is preferred, and specifically, pentane, normal hexane, or cyclohexane is preferably used.

From the viewpoints of polymerization initiation efficiency and a homogeneous mixing property with a monomer, a concentration of the organic lithium dissolved in the hydrocarbon solvent is preferably in a range of 0.01 to 1% by mass, and more preferably 0.1% by mass to 0.8% by mass.

The polymerization reaction of the conjugated diene-based compound is performed preferably in a solvent.

Examples of the solvent include hydrocarbon-based solvents such as saturated hydrocarbons and aromatic hydrocarbons. Specific examples include acyclic aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene; and a hydrocarbon of a mixture of two or more of these.

Before use in the polymerization reaction, allenes and acetylenes corresponding to impurities in the conjugated diene-based compound are treated with an organometallic compound, and thus, a polymer having an active end in a high concentration tends to be obtained. Accordingly, if a modification reaction is to be performed after the polymerization reaction, a high modification ratio tends to be obtained, and therefore, the above-described treatment is preferably performed.

In the polymerization reaction of the conjugated diene-based compound, a polar compound may be added.

The polar compound can be used for randomly copolymerizing the aromatic vinyl compound with the conjugated diene-based compound, and can be used also as a vinylation agent for controlling a microstructure of a conjugated diene portion. Besides, the use of the polar compound is effective also for improvement of a polymerization rate and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkaline metal alkoxide compounds such as potassium-t-amylate, potassium-t-butylate, sodium-t-butylate, and sodium amylate; and phosphine compounds such as triphenylphosphine. One of these polar compounds may be singly used, or two or more of these may be used in combination.

The amount of the polar compound to be used is not especially limited but can be selected in accordance with the purpose or the like. The amount is usually preferably 0.01 mol to 100 mol per mole of the polymerization initiator. Such a polar compound (a vinylation agent) can be used, as a microstructure modifier for a conjugated diene portion of the conjugated diene-based polymer (B), in an appropriate amount in accordance with a desired amount of bound vinyl.

Many polar compounds have an effective randomizing effect in copolymerization of a conjugated diene-based compound and an aromatic vinyl compound, and can be used as a modifier for the distribution of the aromatic vinyl compound, and a modifier for the amount of a styrene block.

As a method for randomizing the conjugated diene-based compound and the aromatic vinyl compound, for example, a method as described in Japanese Patent Laid-Open No. 59-140211 in which a part of 1,3-butadiene is intermittently added during the copolymerization may be employed.

A polymerization temperature is not especially limited as long as the polymerization proceeds at the temperature, and is preferably 0° C. or more from the viewpoint of productivity, and preferably 120° C. or less from the viewpoint of inhibiting deactivation otherwise occurring during the polymerization.

From the viewpoint of preventing cold flow of the conjugated diene-based polymer (B), a polyfunctional aromatic vinyl compound such as divinylbenzene for controlling branching may be used.

From the viewpoint of a physical property of a vulcanizate, the conjugated diene-based polymer (B) contained in the conjugated diene-based polymer composition of the present embodiment is preferably modified with a modifier of, for example, a compound having a functional group with an interaction with silica, such as a glycidyl group or an alkoxysilyl group.

The modifier is not especially limited, and preferably contains a compound represented by any one of the following general formulas (A) to (D):

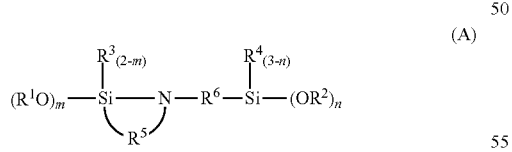

(A)

wherein $R^1$ to $R^4$ each independently represent an alkyl group having 1 to 20 carbon atoms, or an aryl group having 6 to 20 carbon atoms, $R^5$ represents an alkylene group having 1 to 10 carbon atoms, and $R^6$ represents an alkylene group having 1 to 20 carbon atoms;

m represents an integer of 1 or 2, n represents an integer of 2 or 3, and (m+n) is an integer of 4 or more; and each of $R^1$ to $R^4$, if present in a plural number, is respectively independent.

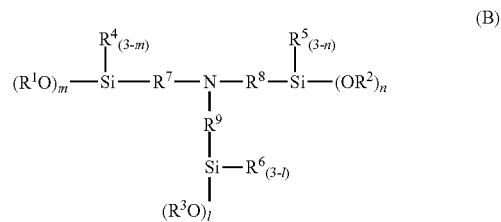

(B)

wherein $R^1$ to $R^6$ each independently represent an alkyl group having 1 to 20 carbon atoms, or an aryl group having 6 to 20 carbon atoms, and $R^7$ to $R^9$ each independently represent an alkylene group having 1 to 20 carbon atoms;

m, n, and l each independently represent an integer of 1 to 3, (m+n+l) is an integer of 4 or more; and each of $R^1$ to $R^6$, if present in a plural number, is respectively independent.

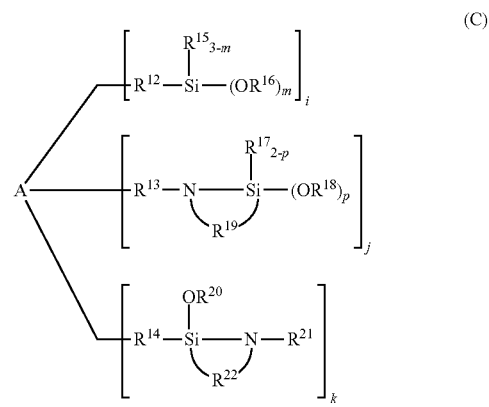

(C)

wherein $R^{12}$ to $R^{14}$ each independently represent a single bond, or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group or a trialkyl silyl group having 1 to 20 carbon atoms;

m represents an integer of 1 to 3, and p represents 1 or 2;
each of $R^{12}$ to $R^{22}$, m, and p, if present in a plural number, is respectively independent, and may be the same or different;
i represents an integer of 0 to 6, j represents an integer of 0 to 6, k represents an integer of 0 to 6, and (i+j+k) is an integer of 4 to 10; and
A represents a hydrocarbon group having 1 to 20 carbon atoms, or an organic group having at least one atom selected from the group consisting of an oxygen atom, a nitrogen atom, a silicon atom, a sulfur atom, and a phosphorus atom, and not having active hydrogen.

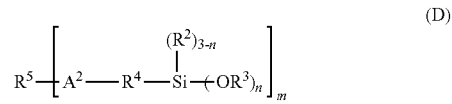

(D)

wherein R² and R³ each independently represent a hydrocarbyl group having 1 to 20 carbon atoms, R⁴ represents an alkanediyl group having 1 to 20 carbon atoms, A² represents a group "*—C(R¹)=N—" or a group "*—N=C(R¹)—" (wherein R¹ represents a hydrogen atom or a hydrocarbyl group, and "*" represents a bonding hand bonded to R⁵);

R⁵ represents an m-valent hydrocarbyl group having 1 to 20 carbon atoms, or an m-valent group having 1 to 20 carbon atoms, having at least one atom selected from the group consisting of a nitrogen atom, an oxygen atom, and a sulfur atom, and not having active hydrogen;

n represents an integer of 1 to 3, m represents an integer of 2 to 10; and each of R², R³, R⁴, and A² present in a plural number in the formula (D) may be the same or different.

Examples of the modifier represented by the formula (A) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

Among these, from the viewpoint of reactivity and interactivity between a functional group of the modifier and an inorganic filler such as silica, and from the viewpoint of processability, it is preferable that m is 2 and that n is 3. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The reaction temperature, the reaction time and the like in causing the modifier represented by the formula (A) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by the formula (A) is preferably 0.6 or more times and 3.0 or less times, more preferably 0.8 or more times and 2.5 or less times, and further preferably 0.8 or more times and 2.0 or less times of a mole number of an alkaline metal compound and/or an alkaline earth metal compound of a polymerization initiator to be added. From the viewpoint that the thus obtained modified conjugated diene-based polymer (B) has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

A more specific mole number of the polymerization initiator is preferably 3.0-fold moles or more, and more preferably 4.0-fold moles or more relative to the mole number of the modifier.

Examples of the modifier represented by formula (B) include, but are not limited to, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine.

Among these, from the viewpoint of reactivity and interactivity between a functional group of the modifier and an inorganic filler such as silica, and from the viewpoint of processability, it is preferable that n, m and 1 are all 3. Specific preferable examples include tris(3-trimethoxysilylpropyl)amine, and tris(3-triethoxysilylpropyl)amine.

The reaction temperature, the reaction time and the like in causing the modifier represented by the formula (B) to react with the polymer active end are not especially limited, and it is preferable to perform the reaction at 0° C. or more and 120° C. or less for 30 seconds or more.

A total mole number of an alkoxy group bonded to a silyl group of the compound used as the modifier represented by the formula (B) is preferably 0.6 or more times and 3.0 or less times, more preferably 0.8 or more times and 2.5 or less times, and further preferably 0.8 or more times and 2.0 or less times of a mole number of lithium contained in the polymerization initiator described above. From the viewpoint that the modified conjugated diene-based polymer (B) has sufficient modification ratio and molecular weight and has a branch structure, the total mole number is preferably 0.6 times or more, and a branched polymer component is preferably obtained by coupling polymer ends for improving processability, and in addition, from the viewpoint of cost of a modifier, the total mole number is preferably 3.0 times or less.

A more specific mole number of the polymerization initiator is preferably 4.0-fold moles or more, and more preferably 5.0-fold moles or more relative to the mole number of the modifier.

In the formula (C), A is preferably represented by any one of the following general formulas (II) to (V):

(II)

wherein B¹ represents a single bond or a hydrocarbon group having 1 to 20 carbon atoms, a represents an integer of 1 to 10, and B¹, if present in a plural number, is respectively independent;

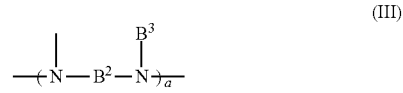

(III)

wherein B² represents a single bond or a hydrocarbon group having 1 to 20 carbon atoms, B³ represents an alkyl group having 1 to 20 carbon atoms, a represents an integer of 1 to 10, and each of B² and B³, if present in a plural number, is respectively independent;

(IV)

wherein $B^4$ represents a single bond or a hydrocarbon group having 1 to 20 carbon atoms, a represents an integer of 1 to 10, and $B^4$, if present in a plural number, is respectively independent; and

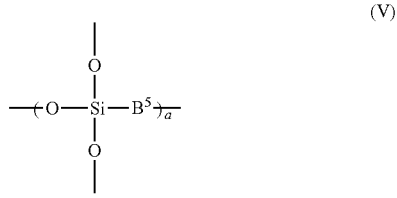

(V)

wherein $B^5$ represents a single bond or a hydrocarbon group having 1 to 20 carbon atoms, a represents an integer of 1 to 10, and $B^5$, if present in a plural number, is respectively independent.

Examples of the modifier represented by the formula (C) wherein A is represented by the formula (II) include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, and bis(3-trimethoxysilylpropyl)-bis[3-(2,2-dimethoxy-1-aza-2-silacyclopentane)propyl]-1,3-propanediamine.

Other examples include tris[3-(2,2-dimethoxy-1-aza-2-silacyclopentane)propyl]-(3-trimethoxysilylpropyl)-1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, and tris[3-(2,2-diethoxy-1-aza-2-silacyclopentane)propyl]-(3-triethoxysilylpropyl)-1,3-propanediamine.

Still other examples include tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethycyclohexane, and bis(3-trimethoxysilylpropyl)-bis[3-(2,2-dimethoxy-1-aza-2-silacyclopentane)propyl]-1,3-bisaminomethylcyclohexane.

Other examples include tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-bisaminomethylcyclohexane, tris[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, and bis(3-triethoxysilylpropyl)-bis[3-(2,2-diethoxy-1-aza-2-silacyclopentane)propyl]-1,3-bisaminomethylcyclohexane.

Other examples include tris[3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine and pentakis(3-trimethoxysilylpropyl)-diethylenetriamine.

Examples of the modifier represented by formula (C) wherein A is represented by formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3$-bis(3-(trimethoxysilyl)propyl)-1,3-propanediamine) and $N^1$-(3-(bis(3-(trimethoxysilyl) propyl) amino) propyl)-$N^1$-methyl-$N^3$-(3-(methyl (3-(trimethoxysilyl) propyl)amino) propyl)-$N^3$-(3-(trimethoxysilyl)propyl)-1,3-propanediamine.

Examples of the modifier represented by formula (C) wherein A is represented by formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl] silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl] silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the modifier represented by the formula (C) wherein A is represented by the formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

In the formula (C), A is preferably represented by the formula (II) or the formula (III), and k represents 0 (zero).

The modifier represented by the formula (C) tends to be easily available, and tends to make the resultant conjugated diene-based polymer composition of the present embodiment containing the conjugated diene-based polymer (B) more excellent in abrasion resistance and a low hysteresis loss property when in the form of a vulcanizate.

Examples of a particularly preferable modifier include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl) amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

In formula (C), it is more preferable that A is represented by formula (II) or formula (III), and that k represents 0 (zero) and a represents an integer of 2 to 10 in formula (II) or formula (III).

Thus, abrasion resistance and a low hysteresis loss property when in the form of a vulcanizate tend to be more excellent.

Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl) propyl)amino) propyl)-$N^1$-methyl-$N^3$-(3-(methyl (3-(trimethoxysilyl) propyl)amino) propyl)-$N^3$-(3-(trimethoxysilyl)propyl)-1,3-propanediamine.

The amount of the compound represented by the formula (C) to be added as the modifier can be adjusted for causing the modifier to react with the conjugated diene-based polymer in such a manner that a mole number of the modifier relative to a mole number of the conjugated diene-based polymer before the modification can be in a desired stoichiometric ratio, and thus, a desired star polymer branch structure tends to be attained.

A specific mole number of the conjugated diene-based polymer is preferably 5.0-fold moles or more, and more preferably 6.0-fold moles or more relative to the mole number of the modifier.

In this case, in the formula (C), the number of functional groups ((m−1)×i+p×j+k) of the modifier is preferably an integer of 5 to 10, and more preferably an integer of 6 to 10.

In the formula (D), examples of the hydrocarbyl group represented by $R^2$ or $R^3$ include an alkyl group having 1 to 20 carbon atoms, an allyl group, a cycloalkyl group having 3 to 20 carbon atoms, and an aryl group having 6 to 20 carbon atoms.

Examples of the hydrocarbylene group represented by $R^4$ include an alkanediyl group having 1 to 20 carbon atoms, a cycloalkylene group having 3 to 20 carbon atoms, and an arylene group having 6 to 20 carbon atoms. $R^4$ is preferably linear.

To $R^1$ contained in $A^2$, the description given above with respect to "Specific Imino Group" is applied. From the viewpoint of a high effect of improving silica dispersibility, n is preferably 2 or 3, and more preferably 3.

An example of the m-valent hydrocarbyl group represented by $R^5$ includes a group obtained by removing m hydrogen atoms from a chain hydrocarbon having 1 to 20 carbon atoms, an alicyclic hydrocarbon having 3 to 20 carbon atoms, or an aromatic hydrocarbon having 6 to 20 carbon atoms. From the viewpoint that an effect of improving abrasion resistance of a resultant vulcanized rubber is high, the m-valent hydrocarbyl group is preferably a group (an aromatic ring group) obtained by removing m hydrogen atoms from a ring portion of an aromatic hydrocarbon. Examples of the aromatic hydrocarbon include a ring structure represented by the following formula (D-2), and a polycyclic structure in which two or more such ring structures are linked (such as a biphenyl group).

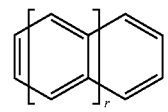

(D-2)

wherein r represents an integer of 0 to 5.

Preferred specific examples of the case where $R^5$ represents, in the formula (D), an m-valent group having 1 to 20 carbon atoms, having at least one atom selected from the group consisting of a nitrogen atom, an oxygen atom, and a sulfur atom, and not having active hydrogen include an m-valent heterocyclic group, and an m-valent group having a tertiary amine structure.

The heterocyclic group is preferably a conjugated group, and an example includes a group obtained by removing m hydrogen atoms from a single ring or a fused ring, such as pyridine, pyrimidine, pyrazine, quinoline, naphthalidine, furan, or thiophen, or from a ring portion of a structure in which a plurality of such single rings or fused rings are linked.

m represents an integer of 2 to 10.

From the viewpoint of processability of a rubber composition, m is preferably 2 to 6.

It is noted that the term "active hydrogen" herein refers to a hydrogen atom bonded to an atom different from a carbon atom, and preferably refers to a hydrogen atom having lower binding energy than a carbon-hydrogen bond of polymethylene.

Examples of the modifier represented by the formula (D) include, but are not limited to, compounds represented by the following formulas (M-1) to (M-23).

One of these may be singly used, or two or more of these may be used in combination.

It is noted that $R^7$ in the formula (M-11) represents a hydrogen atom or an alkyl group.

<Compound [M] Used in Modification Step: Formulas (M-1) to (M-23)>

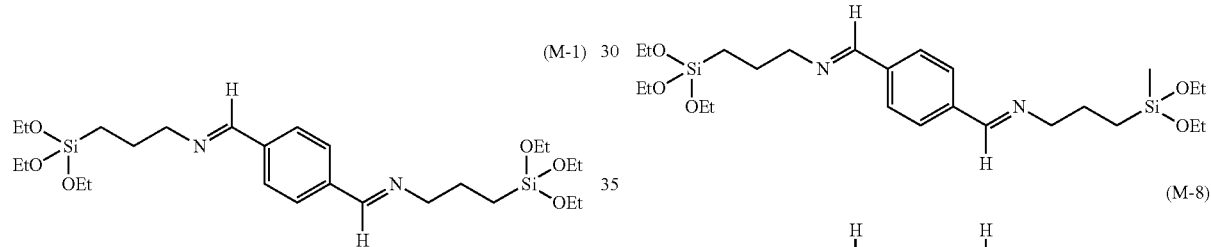

(M-12)
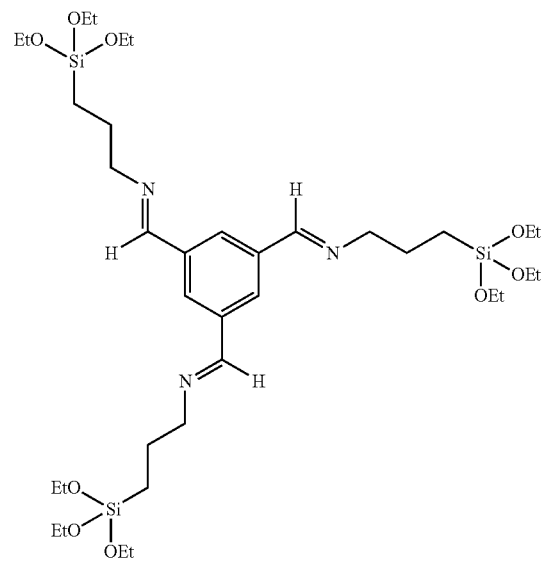
(M-15)
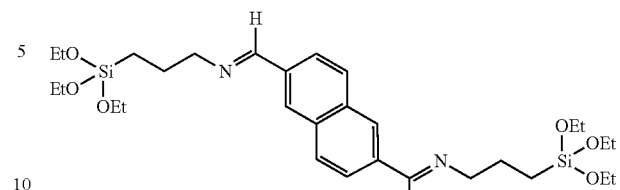
(M-16)
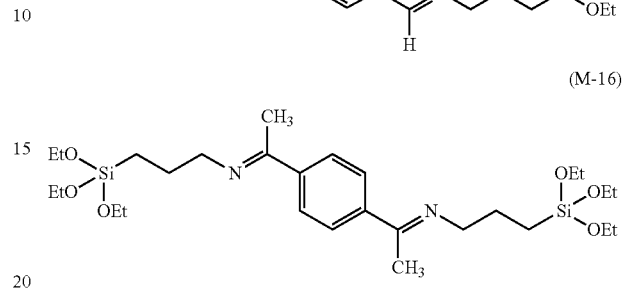
(M-17)
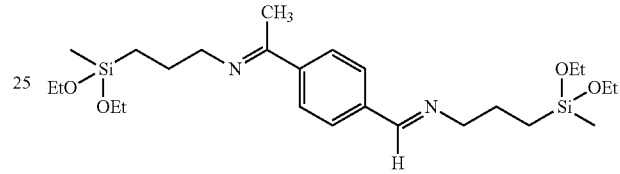
(M-13)
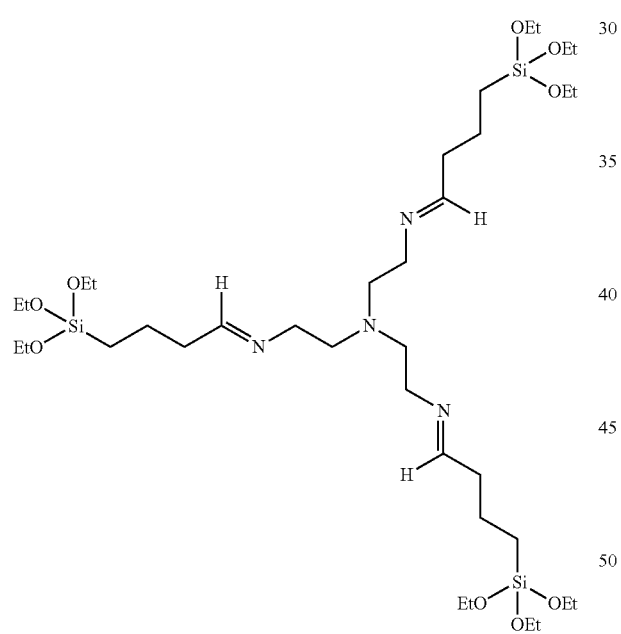
(M-18)
(M-19)
(M-20)
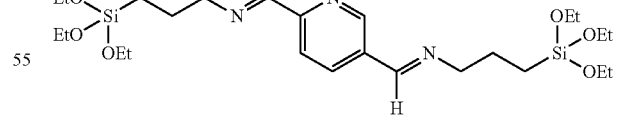
(M-14)
(M-21)
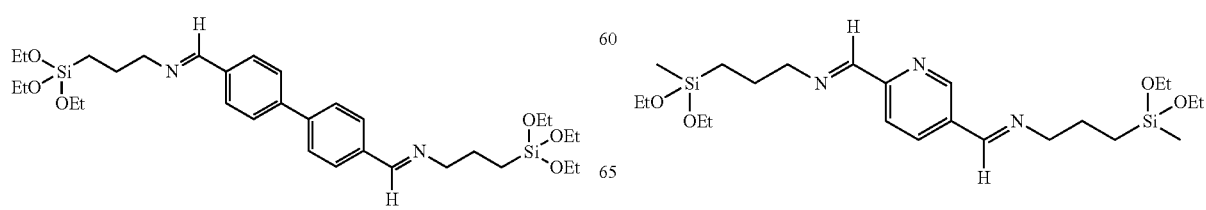

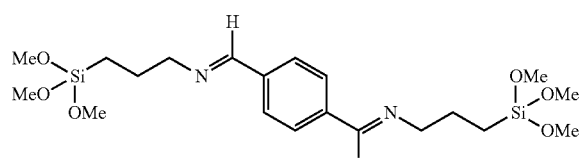
(M-22)

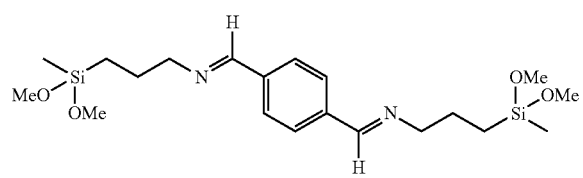
(M-23)

In the formulas (M-1) to (M-23), Et represents an ethyl group, and Me represents a methyl group.

The conjugated diene-based polymer (B) used in the conjugated diene-based polymer composition of the present embodiment is not especially limited, and is preferably a styrene butadiene copolymer, and a commercially available product can be used if necessary.

The commercially available product is not especially limited, and examples include trade name "Tufdene 1834" (glass transition temperature: −73° C.) manufactured by Asahi Kasei Corporation, trade name "Asaprene Y031" (glass transition temperature: −25° C.) manufactured by Asahi Kasei Corporation, trade name "SLR3402" (glass transition temperature: −60° C.) manufactured by Trinseo, trade name "SLR4602" (glass transition temperature: −30° C.) manufactured by Trinseo, trade name "HPR840" (glass transition temperature: −60° C.) manufactured by JSR Corporation, trade name "HPR350" (glass transition temperature: −34° C.) manufactured by JSR Corporation, trade name "HPR355" (glass transition temperature: −25° C.) manufactured by JSR Corporation, trade name "HPR850" (glass transition temperature: −25° C.) manufactured by JSR Corporation, trade name "NS612" (glass transition temperature: −60° C.) manufactured by ZS Elastomers Co., Ltd., and trade name "NS616" (glass transition temperature: −25° C.) manufactured by ZS Elastomers Co., Ltd.

From the viewpoint of further improving wet grip performance, trade name "Asaprene Y031" (glass transition temperature: −25° C.) manufactured by Asahi Kasei Corporation or trade name "HPR350" (glass transition temperature: −34° C.) manufactured by JSR Corporation is preferred, and from the viewpoint of further improving abrasion resistance, trade name "SLR3402" (glass transition temperature: −60° C.) manufactured by Trinseo or trade name "HPR840" (glass transition temperature: −60° C.) manufactured by JSR Corporation is preferred.

(Thermoplastic Resin)

The conjugated diene-based polymer composition of the present embodiment preferably contains 0.5 parts by mass or more and 30 parts by mass or less of a thermoplastic resin with respect to 100 parts by mass of a total amount of the conjugated diene-based polymers (A) and (B) described above.

If the thermoplastic resin is contained in an amount of 0.5 parts by mass or more, grip performance on a wet road surface is excellent.

The thermoplastic resin used in the conjugated diene-based polymer composition of the present embodiment is clearly distinguished from the conjugated diene-based polymers (A) and (B) described above in having a softening point to be softened by heating. Besides, the thermoplastic resin has a glass transition temperature equal to or higher than room temperature in general, and does not have a binding property to silica used as a filler, and hence tends to be inferior in abrasion resistance when in the form of a vulcanizate. From the viewpoint of excellent abrasion resistance, the content of the thermoplastic resin is preferably 10 parts by mass or less, and more preferably 8 parts by mass or less.

The thermoplastic resin used in the conjugated diene-based polymer composition of the present embodiment is not especially limited, and examples include an aromatic petroleum resin, a coumarone-indene resin, a terpene-based resin, a rosin derivative (including a wood oil resin), tall oil, a derivative of tall oil, a rosin ester resin, a natural or synthetic terpene resin, an aliphatic hydrocarbon resin, an aromatic hydrocarbon resin, a mixed aliphatic/aromatic hydrocarbon resin, a coumarin-indene resin, a phenol resin, a p-tert-butylphenol-acetylene resin, a phenol-formaldehyde resin, a xylene-formaldehyde resin, a monoolefin oligomer, a diolefin oligomer, a hydrogenated aromatic hydrocarbon resin, a cyclic aliphatic hydrocarbon resin, a hydrogenated hydrocarbon resin, a hydrocarbon resin, a hydrogenated wood oil resin, a hydrogenated oil resin, and an ester of a hydrogenated oil resin and a monofunctional or polyfunctional alcohol.

One of these thermoplastic resins may be singly used, or two or more of these may be used together. When hydrogenated, all unsaturated groups may be hydrogenated, or some may be left not hydrogenated.

In a preferable aspect, the conjugated diene-based polymer composition of the present embodiment contains 0.5 to 30 parts by mass of the thermoplastic resin, 10 to 90 parts by mass of the conjugated diene-based polymer (A) having a glass transition temperature of −20° C. or more, and 10 to 90 parts by mass of the conjugated diene-based polymer (B) having a glass transition temperature of −25° C. or less. The conjugated diene-based polymer composition of the present embodiment employing this proportion is excellent in rolling resistance, grip performance on a wet road surface, and abrasion resistance when formed into a tire.

(Rubber-Like Polymer Different from Conjugated Diene-Based Polymers (A) and (B))

The conjugated diene-based polymer composition of the present embodiment may contain a rubber-like polymer different from the conjugated diene-based polymers (A) and (B) (hereinafter simply referred to as the "rubber-like polymer"). Examples of such a rubber-like polymer include, but are not limited to, a conjugated diene-based polymer or a hydrogenated product thereof, a random copolymer of a conjugated diene-based compound and a vinyl aromatic compound, or a hydrogenated product thereof, and a block copolymer of a conjugated diene-based compound and a vinyl aromatic compound, or a hydrogenated product thereof, and other examples include a non-diene-based polymer and a natural rubber.

Specific examples of the rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, and a styrene-butadiene block copolymer or a hydrogenated product thereof, a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α,β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

The above-described various rubber-like polymers may be in the form of a modified rubber imparted with a functional group having polarity such as a hydroxyl group or an amino group. For use in a tire, a butadiene rubber, an isoprene rubber, a styrene-butadiene rubber, a natural rubber and a butyl rubber are preferably used.

The weight average molecular weight of the rubber-like polymer is, from the viewpoint of balance between various performances and processing characteristics of the resin composition, preferably 2,000 or more and 2,000,000 or less, and more preferably 5,000 or more and 1,500,000 or less. Besides, a rubber-like polymer having a low molecular weight, namely, what is called a liquid rubber, can be used.

One of these rubber-like polymers may be singly used, or two or more of these may be used together.

If the conjugated diene-based polymer composition of the present embodiment is obtained as a composition containing the rubber-like polymer, a content ratio (in a mass ratio) of the total amount of the conjugated diene-based polymers (A) and (B) described above to the rubber-like polymer is, in terms of (the modified conjugated diene-based polymers (A) and (B)/the rubber-like polymer), preferably 10/90 or more and 100/0 or less, more preferably 20/80 or more and 90/10 or less, and further preferably 50/50 or more and 80/20 or less.

(Silica-Based Inorganic Filler)

The conjugated diene-based polymer composition of the present embodiment preferably contains a silica-based inorganic filler.

From the viewpoints of exhibiting rolling resistance, and attaining practically sufficient processability, cut resistance, and fatigue resistance, an amount of the silica-based inorganic filler to be blended is preferably 0.5 to 300 parts by mass, more preferably 5 to 200 parts by mass, and further preferably 20 to 100 parts by mass with respect to 100 parts by mass of a total amount of the conjugated diene-based polymer (A), the conjugated diene-based polymer (B), and the rubber-like polymer.

The silica-based inorganic filler is not especially limited, and for example, any of known fillers can be used.

As the silica-based inorganic filler, specifically, a solid particle containing $SiO_2$ or $Si_3Al$ as a constituent unit is preferred, and it is more preferable to contain $SiO_2$ or $Si_3Al$ as a principal component of the constituent unit. Here, the term "as a principal component" refers to that a component of interest is contained in the silica-based inorganic filler in an amount of 50% by mass or more. The silica-based inorganic filler contains $SiO_2$ or $Si_3Al$ in an amount of preferably 70% by mass or more, and more preferably 80% by mass or more.

More specific examples of the silica-based inorganic filler include silica, clay, talc, mica, diatomite, wollastonite, montmorillonite, zeolite and inorganic fibrous substances such as glass fiber.

Besides, a silica-based inorganic filler having a hydrophobized surface, or a mixture of a silica-based inorganic filler and an inorganic filler excluding silica can be used.

Among these, from the viewpoint of strength and abrasion resistance, silica and glass fiber are preferred, and silica is more preferred. Examples of the silica include dry silica, wet silica and synthetic silicate silica. Among these, wet silica is preferred.

An example of the dry silica includes silica that is obtained through a reaction of purified silicon tetrachloride in a high temperature flame, has a higher purity than wet silica, consists of fine particles, and has a very low moisture content. In general, the dry silica is widely used as a filler for a silicone rubber, a thickener for a resin, a reinforcing agent, a fluidizer for a powder, and a raw material of ceramics.

An example of the wet silica includes a light white powder having a fluffy appearance that is obtained from a raw material of sodium silicate made from quartz sand by neutralizing an aqueous solution of the sodium silicate to precipitate silica, and filtering/drying the precipitated silica. In general, the wet silica is used as a reinforcing filler of a synthetic rubber, for powdering and preventing hardening a liquid such as an agricultural chemical, for preventing a printing ink from bleeding through lightweight paper, for thickening/preventing dripping of a paint and an ink, as a heat insulating material, and as an abrading agent.

In the conjugated diene-based polymer composition of the present embodiment, from the viewpoint of obtaining more excellent rolling resistance, a nitrogen adsorption specific surface area, obtained by the BET adsorption method, of the silica-based inorganic filler is preferably 100 to 300 $m^2/g$, and more preferably 170 to 250 $m^2/g$.

(Carbon Black)

The conjugated diene-based polymer composition of the present embodiment preferably further contains, in addition to the silica-based inorganic filler, 0.5 to 100 parts by mass of carbon black with respect to 100 parts by mass of the total amount of the conjugated diene-based polymer (A), the conjugated diene-based polymer (B) and the rubber-like polymer from the viewpoint of enhancing tensile characteristics and the like.

The carbon black is not especially limited, and examples include carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or more is preferred from the viewpoints of extrusion moldability and rolling resistance.

An amount of the carbon black to be blended is more preferably 3 to 100 parts by mass, and further preferably 5 to 50 parts by mass with respect to 100 parts by mass of the total amount of the conjugated diene-based polymer (A), the conjugated diene-based polymer (B), and the rubber-like polymer from the viewpoint of balance among rolling resistance, extrusion processability, and cut resistance.

(Metal Oxide and Metal Hydroxide)

The conjugated diene-based polymer composition of the present embodiment may contain a metal oxide or a metal hydroxide in addition to the silica-based inorganic filler and the carbon black.

The metal oxide refers to a solid particle containing, as a principal component of a constituent unit, a substance represented by chemical formula $M_xO_y$ (wherein M represents a metal atom, and x and y each independently represent an integer of 1 to 6). Examples include alumina, titanium oxide, magnesium oxide and zinc oxide. Besides, a mixture of a metal oxide and an inorganic filler excluding a metal oxide can be used. The metal hydroxide is not especially limited, and examples include aluminum hydroxide, magnesium hydroxide and zirconium hydroxide.

A method for identifying the type or the content ratio of a rubber component contained in the conjugated diene-based polymer composition of the present embodiment is not especially limited, and the identification can be performed by employing NMR.

For example, as already reported (JSR TECHNICAL REVIEW No. 126/2019), solid 13C-NMR can be employed to quantitatively calculate a ratio among a styrene unit, 1,2-vinyl, 1,4-vinyl, a 1,4-cis bond, and an isoprene unit contained in the conjugated diene-based polymer composition.

(Silane Coupling Agent)

The conjugated diene-based polymer composition of the present embodiment may contain a silane coupling agent. The silane coupling agent has a group having affinity with or a binding property to each of the rubber component, the rubber-like polymer and the silica-based inorganic filler, and has a function to make close the interaction among these. In general, a compound containing, in one molecule, a sulfur bond portion and an alkoxysilyl group or silanol group portion is used.

Examples of the silane coupling agent include, but are not limited to, silane coupling agents having a mercapto group, such as 3-mercaptopropyltrimethoxysilane, 3-mercaptopropylethoxysilane, 2-mercaptoethyltrimethoxysilane, 2-mercaptoethyltriethoxysilane, ethoxy(3-mercaptopropyl)bis(3, 6,9,12,15-pentaoxaoctacosan-1-yloxy)silane [manufactured by Evonik Degussa: Si363], and NXT-Z30, NXT-Z45, NXTZ60 and NXT silane manufactured by Momentive, bis[3-(triethoxysilyl)-propyl]-tetrasulfide, bis[3-(triethoxysilyl)-propyl]-disulfide, bis[2-(triethoxysilyl)-ethyl]-tetrasulfide, bis(3-triethoxysilylpropyl)trisulfide, bis[2-(triethoxysilyl)-ethyl]-tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazolyltetrasulfide. Among these, from the viewpoint of a high reinforcing effect, bis[3-(triethoxysilyl)-propyl]-disulfide, silane coupling agents having a mercapto group, such as ethoxy (3-mercaptopropyl)bis(3,6,9,12,15-pentaoxaoctacosan-1-yloxy)silane [manufactured by Evonik Degussa: Si363], and NXT-Z30, NXT-Z45, NXTZ60 and NXT silane manufactured by Momentive, and bis[3-(triethoxysilyl)-propyl]-tetrasulfide are preferred. One of these silane coupling agents can be singly used, or two or more of these can be used in combination.

An amount of the silane coupling agent to be blended is, from the viewpoint of further remarkably obtaining the effect to make close the interaction between the rubber component and the silica-based inorganic filler, preferably 0.1 to 30 parts by mass, more preferably 0.5 to 20 parts by mass, and further preferably 1 to 15 parts by mass with respect to 100 parts by mass of the total amount of the conjugated diene-based polymer (A), the conjugated diene-based polymer (B), and the rubber-like polymer.

(Rubber Softener)

The conjugated diene-based polymer composition of the present embodiment may contain a rubber softener for improving the processability.

As the rubber softener, for example, a mineral oil-based rubber softener, or a liquid or low molecular weight synthetic softener is suitably used.

The mineral oil-based rubber softener, which is also designated as a process oil or an extender oil, is used for softening, expanding and improving processability of a rubber. The mineral oil-based rubber softener is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% to 45% is designated as a naphthene-based softener, and one in which the number of aromatic carbon atoms exceeds 30% is designated as an aromatic-based softener. As a rubber softener to be used together with a modified conjugated diene-aromatic vinyl copolymer, one having an appropriate aromatic content is preferred because such a softener tends to have high affinity with the copolymer.

An amount of the rubber softener to be blended is preferably 0 to 100 parts by mass, more preferably 10 to 90 parts by mass, and further preferably 30 to 90 parts by mass with respect to 100 parts by mass of the total amount of the conjugated diene-based polymer (A), the conjugated diene-based polymer (B), and the rubber-like polymer.

If the amount of the rubber softener to be blended falls in the above-described numerical range, occurrence of bleeding out can be suppressed, and the surface of the resultant conjugated diene-based polymer composition can be prevented from being sticky.

[Production Method for Conjugated Diene-Based Polymer Composition]

The conjugated diene-based polymer composition of the present embodiment can be obtained by mixing constituent materials such as the conjugated diene-based polymers (A) and (B) described above, the above-described thermoplastic resin, the rubber-like polymer, the silica-based inorganic filler, carbon black and another filler if necessary, and additives such as the silane coupling agent and the rubber softener.

Examples of a method for mixing the constituent materials include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating.

Among these methods, the melt-kneading method using a roll, a banbury mixer, a kneader or an extruder is preferred from the viewpoint of productivity and high kneadability.

Besides, either of a method in which the constituent materials of the conjugated diene-based polymer composition of the present embodiment are kneaded all together or a method in which the materials are mixed dividedly in plural times is applicable.

The conjugated diene-based polymer composition of the present embodiment may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds.

The sulfur compounds include sulfur monochloride, sulfur dichloride, disulfide compounds and high molecular weight polysulfide compounds.

A content of the vulcanizing agent is preferably 0.01 parts by mass or more and 20 parts by mass or less, and more preferably 0.1 parts by mass or more and 15 parts by mass or less with respect to 100 parts by mass of the total amount of the conjugated diene-based polymer (A), the conjugated diene-based polymer (B), and the rubber-like polymer. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator and a vulcanization aid may be used if necessary.

As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators.

Besides, examples of a vulcanization aid include, but are not limited to, zinc oxide and stearic acid.

A content of the vulcanization accelerator is preferably 0.01 parts by mass or more and 20 parts by mass or less, and more preferably 0.1 parts by mass or more and 15 parts by mass or less with respect to 100 parts by mass of the total amount of the conjugated diene-based polymer (A), the conjugated diene-based polymer (B), and the rubber-like polymer.

The conjugated diene-based polymer composition of the present embodiment may contain, as long as the object of the present embodiment is not impaired, various additives such as another softener excluding those described above, a filler, a heat resistance stabilizer, an antistatic agent, a weathering stabilizer, an anti-ageing agent, a colorant and a lubricant.

As another softener, any of known softeners can be used.

Specific examples of another filler include calcium carbonate, magnesium carbonate, aluminum sulfate and barium sulfate.

As each of the heat resistance stabilizer, the antistatic agent, the weathering stabilizer, the anti-ageing agent, the colorant and the lubricant, any of known materials can be used.

[Tire]

The conjugated diene-based polymer composition of the present embodiment is suitably used as a rubber composition for a tire. In other words, a tire of the present embodiment contains the conjugated diene-based polymer composition of the present embodiment.

The conjugated diene-based polymer composition of the present embodiment is applicable to, but not limited to, various tires such as a fuel-efficient tire, an all-season tire, a high-performance tire and a studless tire; and various tire portions such as a tread, a carcass, a sidewall and a bead.

In particular, since the conjugated diene-based polymer composition of the present embodiment is excellent in the balance between a low hysteresis loss property and wet performance obtained when in the form of a vulcanizate and in the abrasion resistance, it is more suitably used as a tread of a fuel-efficient tire or a high-performance tire.

EXAMPLES

The present embodiment will now be described in more detail with reference to specific examples and comparative examples, and it is noted that the present embodiment is not limited to the following examples and comparative examples at all.

Various physical properties of the examples and comparative examples were measured by the following methods.

In the following examples and comparative examples, a conjugated diene-based polymer obtained after modification is referred to as the "modified conjugated diene-based polymer".

One obtained before the modification is referred to as the "unmodified conjugated diene-based polymer".

Besides, those obtained through modification or without modification are generically designated as "conjugated diene-based polymer" in some cases.

(Physical Property 1) Amount of Bound Styrene

One hundred (100) mg of a modified conjugated diene-based polymer or an unmodified conjugated diene-based polymer (sample 19) used as a sample was dissolved in chloroform to be diluted to 100 mL, and the resultant was used as a measurement sample. Based on the amount of absorption of a phenyl group of styrene at a UV absorption wavelength (about 254 nm), the amount of bound styrene (% by mass) with respect to 100% by mass of the sample of the modified conjugated diene-based polymer or the unmodified conjugated diene-based polymer (sample 19) was measured (spectrophotometer "UV-2450" manufactured by Shimadzu Corporation).

(Physical Property 2) Microstructure of Butadiene Portion (Amount of 1,2-Vinyl Bond)

Fifty (50) mg of a modified conjugated diene-based polymer or an unmodified conjugated diene-based polymer (sample 19) used as a sample was dissolved in 10 mL of carbon disulfide, and the resultant was used as a measurement sample.

A solution cell was used to measure an infrared spectrum in a range of 600 to 1000 cm-1, and in accordance with a calculation formula of the Hampton method (R. R. Hampton, Analytical Chemistry 21, 923 (1949)) based on absorbance at a prescribed wavelength, a microstructure of a butadiene portion, namely, an amount of 1,2-vinyl bond (mol %) was obtained (Fourier transform infrared spectrophotometer "FT-IR230" manufactured by JASCO Corporation).

(Physical Property 3) Molecular Weight

Measurement Conditions 1: An unmodified conjugated diene-based polymer or a modified conjugated diene-based polymer used as a sample was measured for a chromatogram using a GPC measurement apparatus (trade name "HLC-8320GPC" manufactured by Tosoh Corporation) including a series of three columns using a polystyrene-based gel as a filler with an RI detector (trade name "HLC8020" manufactured by Tosoh Corporation) used, and on the basis of a calibration curve obtained using standard polystyrene, a weight average molecular weight (Mw), a number average molecular weight (Mn) and a molecular weight distribution (Mw/Mn) were obtained.

As an eluent, THF (tetrahydrofuran) containing 5 mmol/L of triethylamine was used. As the columns, trade name "TSKguardcolumn Super MP(HZ)-H" manufactured by Tosoh Corporation connected, as a guard column at a previous stage, to a series of three columns of trade name "TSKgel Super Multipore HZ-H" manufactured by Tosoh Corporation were used.

Ten (10) mg of a sample for the measurement was dissolved in 10 mL of THF to obtain a measurement solution, and 10 µL of the measurement solution was injected into the GPC measurement apparatus for performing the measurement under conditions of an oven temperature of 40° C. and a THF flow rate of 0.35 mL/min.

Among various samples having been subjected to the measurement under the above-described measurement conditions 1, a sample having a molecular weight distribution (Mw/Mn) less than 1.6 was subjected again to the measurement under measurement conditions 2 described below. With respect to samples having been subjected to the measurement under the measurement conditions 1 and found to have a molecular weight distribution of 1.6 or more, results obtained by the measurement under the measurement conditions 1 are shown in Tables 1 to 3.

Measurement Conditions 2: An unmodified conjugated diene-based polymer or a modified conjugated diene-based polymer used as a sample was measured for a chromatogram using a GPC measurement apparatus including a series of three columns using a polystyrene-based gel as a filler, and on the basis of a calibration curve obtained using standard polystyrene, a weight average molecular weight (Mw), and a number average molecular weight (Mn) were obtained.

As an eluent, THF containing 5 mmol/L of triethylamine was used. As the columns, a guard column of trade name "TSKguardcolumn Super H-H" manufactured by Tosoh Corporation, and columns of trade names "TSKgel SuperH5000", "TSKgel SuperH6000", and "TSKgel SuperH7000" manufactured by Tosoh Corporation were used.

An RI detector (trade name "HLC8020" manufactured by Tosoh Corporation) was used under conditions of an oven temperature of 40° C. and a THF flow rate of 0.6 mL/min. Ten (10) mg of a sample for the measurement was dissolved in 20 mL of THF to obtain a measurement solution, and 20 μL of the measurement solution was injected into the GPC measurement apparatus for performing the measurement.

With respect to a sample having been subjected to the measurement under the measurement conditions 1 and found to have a molecular weight distribution less than 1.6, results obtained by the measurement under the measurement conditions 2 are shown in Tables 1 to 3.

(Physical Property 4) Contracting Factor (g')

A modified conjugated diene-based polymer or an unmodified conjugated diene-based polymer (sample 19) was used as a sample, and a GPC measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order, so as to obtain, based on standard polystyrene, an absolute molecular weight from measurement results obtained by the light scattering detector and the RI detector, and an intrinsic viscosity from measurement results obtained by the RI detector and the viscosity detector.

A straight-chain polymer was used under assumption of having an intrinsic viscosity $[\eta]$ of $-3.883 \, M^{0.771}$, and a contracting factor (g') was calculated as a ratio in the intrinsic viscosity to each molecular weight. M indicates an absolute molecular weight.

As an eluent, THF containing 5 mmol/L of triethylamine was used.

As the columns, a series of columns of trade names "TSKgel G4000HXL", "TSKgel G5000HXL" and "TSKgel G6000HXL" manufactured by Tosoh Corporation were connected and used.

Twenty (20) mg of a sample for the measurement was dissolved in 10 mL of THF to obtain a measurement solution, and 100 μL of the measurement solution was injected into the GPC measurement apparatus for performing the measurement under conditions of an oven temperature of 40° C. and a THF flow rate of 1 mL/min.

(Physical Property 5) Mooney Viscosity of Polymer

An unmodified conjugated diene-based polymer or a modified conjugated diene-based polymer was used as a sample to measure a Mooney viscosity by using a Mooney viscometer (trade name "VR1132" manufactured by Ueshima Seisakusho Co., Ltd.) in accordance with JIS K6300 with an L-type rotor used.

A measurement temperature was 110° C. when an unmodified conjugated diene-based polymer was used as a sample, and was 100° C. when a modified conjugated diene-based polymer was used as a sample.

First, a sample was preheated at the test temperature for 1 minute, the rotor was rotated at 2 rpm, and a torque was measured 4 minutes after as a Mooney viscosity ($ML_{(1\_4)}$).

(Physical Property 6) Glass Transition Temperature (Tg)

A modified conjugated diene-based polymer or an unmodified conjugated diene-based polymer (sample 19) was used as a sample, a differential scanning calorimeter "DSC3200S" manufactured by Mac Science was used to record a DSC curve under flow of helium at 50 mL/min, with a temperature increased from −100° C. at 20° C./min in accordance with ISO 22768:2006, and a peak top (an inflection point) of a DSC differential curve thus obtained was defined as a glass transition temperature.

(Physical Property 7) Modification Ratio

A modified conjugated diene-based polymer was used as a sample, and the measurement was performed by applying a characteristic that a modified basic polymer component adsorbs onto a GPC column using a silica-based gel as a filler.

A modification ratio was obtained by measuring an amount of adsorption onto a silica-based column based on a difference between a chromatogram measured by using a polystyrene-based column and a chromatogram measured by using a silica-based column obtained from a sample solution containing a sample and low molecular weight internal standard polystyrene.

Specifically, the measurement was performed as described below.

A sample having been subjected to the measurement under measurement conditions 1 of (Physical Property 3) described above and found to have a molecular weight distribution value of 1.6 or more was subjected to the measurement under measurement conditions 3 described below, and the thus obtained measurement value was used. A sample having been subjected to the measurement under the measurement conditions 1 of (Physical Property 3) described above and found to have a molecular weight distribution value less than 1.6 was subjected to the measurement under measurement conditions 4 described below, and the thus obtained measurement value was used. Measurement results thus obtained are shown in Tables 1 to 3.

Preparation of Sample Solution: Ten (10) mg of a sample and 5 mg of standard polystyrene were dissolved in 20 mL of THF to obtain a sample solution.

Measurement Conditions 3: GPC Measurement Conditions Using Polystyrene-Based Column:

An apparatus of trade name "HLC-8320GPC" manufactured by Tosoh Corporation was used, THF containing 5 mmol/L of triethylamine was used as an eluent, and 10 μL of the sample solution was injected into the apparatus to obtain a chromatogram using an RI detector under conditions of a column oven temperature of 40° C. and a THF flow rate of 0.35 mL/min.

As the columns, a series of three columns of trade name "TSKgel Super Multipore HZ-H" and a guard column of trade name "TSKguardcolumn SuperMP(HZ)-H" manufactured by Tosoh Corporation connected at a previous stage were used.

Measurement Conditions 4: GPC Measurement Conditions Using Polystyrene-Based Column:

An apparatus of trade name "HLC-8320GPC" manufactured by Tosoh Corporation was used, THF containing 5 mmol/L of triethylamine was used as an eluent, and 20 μL of the sample solution was injected into the apparatus to perform the measurement.

As the columns, a guard column of trade name "TSKguardcolumn Super H-H" manufactured by Tosoh Corporation and columns of trade names "TSKgel Super H5000", "TSKgel Super H6000", and "TSKgel Super H7000" manufactured by Tosoh Corporation were used. A chromatogram was obtained by performing the measurement by using an RI detector (HLC8020, manufactured by Tosoh Corporation) under conditions of a column oven temperature of 40° C. and a THF flow rate of 0.6 mL/min.

GPC Measurement Conditions Using Silica-Based Column:

An apparatus of trade name "HLC-8320GPC" manufactured by Tosoh Corporation was used, THF was used as an eluent, and 50 μL of the sample solution was injected into the apparatus to obtain a chromatogram by using an RI detector under conditions of a column oven temperature of 40° C. and a THF flow rate of 0.5 mL/min. A series of columns of trade names "Zorbax PSM-1000S", "PSM-300S" and "PSM-60S", and a guard column of trade name "DIOL 4.6×12.5 mm 5 micron" connected at a previous stage were used.

Calculation Method for Modification Ratio:

Assuming that the whole peak area of the chromatogram obtained by using the polystyrene-based column was 100, that a peak area of the sample was P1, that a peak area of standard polystyrene was P2, that the whole peak area of the chromatogram obtained by using the silica-based column was 100, that a peak area of the sample was P3, and that a peak area of standard polystyrene was P4, a modification ratio (%) was obtained in accordance with the following expression:

Modification ratio (%)=[1−(P2×P3)/(P1×P4)]×100 wherein P1+P2=P3+P4=100.

(Physical Property 8) Branch Number (Bn)

A modified conjugated diene-based polymer or an unmodified conjugated diene-based polymer (sample 19) was used as a sample, and a GPC measurement apparatus (trade name "GPCmax VE-2001" manufactured by Malvern Panalytical Ltd.) including a series of three columns using a polystyrene-based gel as a filler was used. The measurement was performed by using three detectors, that is, a light scattering detector, an RI detector, and a viscosity detector (trade name "TDA305" manufactured by Malvern Panalytical Ltd.) connected in the stated order. Based on standard polystyrene, an absolute molecular weight M was obtained from results obtained by using the light scattering detector and the RI detector, and an intrinsic viscosity [η] was obtained from results obtained by using the RI detector and the viscosity detector.

A straight-chain polymer was used under assumption of having an intrinsic viscosity [η] of −3.883 $M^{0.771}$, and a contracting factor (g') was calculated as a ratio in the intrinsic viscosity to each molecular weight. Thereafter, the thus obtained contracting factor (g') was used to calculate a branch number (Bn) defined as g'=6 Bn/{(Bn+1)(Bn+2)}.

As an eluent, THF containing 5 mmol/L of triethylamine was used.

As the columns, a series of columns of trade names "TSKgel G4000HXL", "TSKgel G5000HXL" and "TSKgel G6000HXL" manufactured by Tosoh Corporation were connected and used.

Twenty (20) mg of a sample for the measurement was dissolved in 10 mL of THF to obtain a measurement solution, and 100 μL of the measurement solution was injected into the GPC measurement apparatus for performing the measurement under conditions of an oven temperature of 40° C. and a THF flow rate of 1 mL/min.

(Physical Property 9) Molecular Weight (Absolute Molecular Weight) Obtained by GPC-Light Scattering Measurement A modified conjugated diene-based polymer or an unmodified conjugated diene-based polymer (sample 19) was used as a sample, and a GPC-light scattering measurement apparatus including a series of three columns using a polystyrene-based gel as a filler was used to measure a chromatogram for obtaining a weight average molecular weight (Mw-i) (also designated as an "absolute molecular weight") based on the viscosity of a solution and a light scattering method.

As an eluent, a mixed solution of tetrahydrofuran and triethylamine (THF in TEA: prepared by mixing 5 mL of triethylamine in 1 L of tetrahydrofuran) was used.

As the columns, a series of a guard column of trade name "TSKguardcolumn HHR-H" manufactured by Tosoh Corporation, and columns of trade names "TSKgel G6000HHR", "TSKgel G5000HHR", and "TSKgel G4000HHR" were connected and used.

A GPC-light scattering measurement apparatus (trade name "Viscotek TDAmax" manufactured by Malvern Panalytical Ltd.) was used under conditions of an oven temperature of 40° C. and a THF flow rate of 1.0 mL/min.

Ten (10) mg of a sample for measurement was dissolved in 20 mL of THF to obtain a measurement solution, and 200 μL of the measurement solution was injected into the GPC measurement apparatus for the measurement.

[Conjugated Diene-Based Polymer]

(Modified Conjugated Diene-Based Polymer (Sample 1))

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 17.0 g/min, 11.4 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.075 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, trimethoxy(4-vinylphenyl)silane (shown as "BS-1" in a table) used as a branching agent was added at a rate of 0.0190 mmol/min from the bottom of the second reactor. When the polymerization reaction and the branching reaction were stabilized, a small amount of a conjugated diene-based polymer solution prior to addition of a modifier was taken out, an antioxidant (BHT:dibutylhydroxytoluene) was added thereto in an amount of 0.2 g per 100 g of the polymer, then the solvent was removed, and a Mooney viscosity at 110° C. and various molecular weights were measured. The other physical properties are also shown in Table 1.

Next, to the polymer solution flowing out of an outlet of the reactor, 2,2-dimethoxy-1-(3-trimethoxysilylpropyl)-1-aza-2-silacyclopentane (shown as "A" in the table) was added, as a modifier, continuously at a rate of 0.0360 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution having been subjected to the modification reaction, an antioxidant (BHT) was added in an amount of 0.2 g per 100 g of the polymer continuously at 0.055 g/min (n-hexane solution) to complete the modification reaction. Simultaneously with the antioxidant, an oil (JOMO Process NC 140, manufactured by JX Nippon Oil & Energy Corporation) was continuously added in an amount of 37.5 g per 100 g of the polymer, and the resultant was mixed by using a static mixer. The solvent was removed by steam stripping, and thus, a modified conjugated diene-based polymer (sample 1) was obtained. Physical properties of the sample 1 are shown in Table 1.

(Modified Conjugated Diene-Based Polymer (Sample 2))

A modified conjugated diene-based polymer (sample 2) was obtained in the same manner as in the sample 1 except that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 2 are shown in Table 1.

(Modified Conjugated Diene-Based Polymer (Sample 3))

A modified conjugated diene-based polymer (sample 3) was obtained in the same manner as the sample 1 except that the modifier was changed from 2,2-dimethoxy-1-(3-trimethoxysilylpropyl)-1-aza-2-silacyclopentane to tetrakis (3-trimethoxysilylpropyl)-1,3-propanediamine (shown as "C" in the table), and that the amount thereof to be added was changed to 0.0190 mmol/min. Physical properties of the sample 3 are shown in Table 1.

(Modified Conjugated Diene-Based Polymer (Sample 4))

A modified conjugated diene-based polymer (sample 4) was obtained in the same manner as the sample 1 except that the branching agent was changed from trimethoxy(4-vinylphenyl)silane to dimethylmethoxy(4-vinylphenyl)silane (shown as "BS-2" in the table), and that the amount thereof to be added was changed to 0.0350 mmol/min. Physical properties of the sample 4 are shown in Table 1.

(Modified Conjugated Diene-Based Polymer (Sample 5))

A modified conjugated diene-based polymer (sample 5) was obtained in the same manner as the sample 1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table), and that the amount thereof to be added was changed to 0.0250 mmol/min. Physical properties of the sample 5 are shown in Table 1.

(Modified Conjugated Diene-Based Polymer (Sample 6))

A modified conjugated diene-based polymer (sample 6) was obtained in the same manner as the sample 1 except that the branching agent was changed from trimethoxy(4-vinylphenyl)silane to dimethylmethoxy(4-vinylphenyl)silane (shown as "BS-2" in the table), that the amount thereof to be added was changed to 0.0350 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table), and that the amount thereof to be added was changed to 0.0160 mmol/min. Physical properties of the sample 6 are shown in Table 1.

(Modified Conjugated Diene-Based Polymer (Sample 7))

A modified conjugated diene-based polymer (sample 7) was obtained in the same manner as the sample 1 except that the branching agent was changed from trimethoxy(4-vinylphenyl)silane to 1,1-bis(4-dimethylmethoxysilyl)phenyl) ethylene (shown as "BS-3" in the table), and that the amount thereof to be added was changed to 0.0120 mmol/min. Physical properties of the sample 7 are shown in Table 1.

(Modified Conjugated Diene-Based Polymer (Sample 8))

A modified conjugated diene-based polymer (sample 8) was obtained in the same manner as in the sample 1 except that the branching agent was changed from trimethoxy(4-vinylphenyl)silane to 1,1-bis(4-dimethylmethoxysilyl)phenyl)ethylene (shown as "BS-3" in the table), that the amount thereof to be added was changed to 0.0120 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table), and that the amount thereof to be added was changed to 0.0250 mmol/min. Physical properties of the sample 8 are shown in Table 1.

(Modified Conjugated Diene-Based Polymer (Sample 9))

A modified conjugated diene-based polymer (sample 9) was obtained in the same manner as the sample 1 except that the branching agent was changed from trimethoxy(4-vinylphenyl)silane to 1,1-bis(4-dimethylmethoxysilyl)phenyl) ethylene (shown as "BS-3" in the table), that the amount thereof to be added was changed to 0.0120 mmol/min, that the modifier was changed from 2,2-dimethoxy-1-(3-trimethoxysilylpropyl)-1-aza-2-silacyclopentane to tetrakis (3-trimethoxysilylpropyl)-1,3-propanediamine (shown as "C" in the table), and that the amount thereof to be added was changed to 0.0160 mmol/min. Physical properties of the sample 9 are shown in Table 1.

(Modified Conjugated Diene-Based Polymer (Sample 10))

A modified conjugated diene-based polymer (sample 10) was obtained in the same manner as in the sample 1 except that the branching agent was changed from trimethoxy(4-vinylphenyl)silane to 1,1-bis(4-trimethoxysilylphenyl)ethylene (shown as "BS-4" in the table), and that the amount thereof to be added was changed to 0.0210 mmol/min. Physical properties of the sample 10 are shown in Table 2.

(Modified Conjugated Diene-Based Polymer (Sample 11))

A modified conjugated diene-based polymer (sample 11) was obtained in the same manner as the sample 1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the modifier was changed from 2,2-dimethoxy-1-(3-trimethoxysilylpropyl)-1-aza-2-silacyclopentane to tris(3-trimethoxysilylpropyl)amine (shown as "B" in the table), and that the amount thereof to be added was changed to 0.0250 mmol/min. Physical properties of the sample 11 are shown in Table 2.

(Modified Conjugated Diene-Based Polymer (Sample 12))

A modified conjugated diene-based polymer (sample 12) was obtained in the same manner as the sample 1 except that the branching agent was changed from trimethoxy(4-vinylphenyl)silane to 1,1-bis(4-trimethoxysilylphenyl)ethylene (shown as "BS-4" in the table), that the amount thereof to be added was changed to 0.0210 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table), and that the amount thereof to be added was changed to 0.0160 mmol/min. Physical properties of the sample 12 are shown in Table 2.

(Modified Conjugated Diene-Based Polymer (Sample 13))

A modified conjugated diene-based polymer (sample 13) was obtained in the same manner as the sample 1 except that the branching agent was changed from trimethoxy(4-vinylphenyl)silane to trichloro(4-vinylphenyl)silane (shown as "BS-5" in the table). Physical properties of the sample 13 are shown in Table 2.

(Modified Conjugated Diene-Based Polymer (Sample 14)

A modified conjugated diene-based polymer (sample 14) was obtained in the same manner as the sample 1 except that the branching agent was changed from trimethoxy(4-vinylphenyl)silane to trichloro(4-vinylphenyl)silane (shown as "BS-5" in the table), that the modifier was changed from 2,2-dimethoxy-1-(3-trimethoxysilylpropyl)-1-aza-2-silacyclopentane to tris(3-trimethoxysilylpropyl)amine (shown as "B" in the table), and that the amount thereof to be added was changed to 0.0250 mmol/min. Physical properties of the sample 14 are shown in Table 2.

(Modified Conjugated Diene-Based Polymer (Sample 15))

A modified conjugated diene-based polymer (sample 15) was obtained in the same manner as the sample 1 except that the branching agent was changed from trimethoxy(4-vinylphenyl)silane to trichloro(4-vinylphenyl)silane (shown as "BS-5" in the table), that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table), and that the amount thereof to be added was changed to 0.0190 mmol/min. Physical properties of the sample 15 are shown in Table 2.

(Modified Conjugated Diene-Based Polymer (Sample 16))

A modified conjugated diene-based polymer (sample 16) was obtained in the same manner as the sample 1 except that the amount of the branching agent to be added was changed to 0.025 mmol/min, that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table), and that the amount thereof to be added was changed to 0.0160 mmol/min. Physical properties of the sample 16 are shown in Table 2.

(Modified Conjugated Diene-Based Polymer (Sample 17))

A modified conjugated diene-based polymer (sample 17) was obtained in the same manner as the sample 1 except that the modifier was changed from 2,2-dimethoxy-1-(3-trimethoxysilylpropyl)-1-aza-2-silacyclopentane to tetrakis(3-trimethoxysilylpropyl)-1,3-propanediamine (shown as "C" in the table), and that the amount thereof to be added was changed to 0.0110 mmol/min. Physical properties of the sample 17 are shown in Table 2.

(Conjugated Diene-Based Polymer (Sample 18))

A conjugated diene-based polymer (sample 18) was obtained in the same manner as in the sample 1 except that the modifier was changed from 2,2-dimethoxy-1-(3-trimethoxysilylpropyl)-1-aza-2-silacyclopentane to a coupling agent of tetraethoxysilane (shown as "D" in the table"), and that the amount thereof to be added was changed to 0.0250 mmol/min. Physical properties of the sample 18 are shown in Table 2.

(Conjugated Diene-Based Polymer (Sample 19))

An unmodified conjugated diene-based polymer (sample 19) was obtained in the same manner as the sample 1 except that no modifier was added. Physical properties of the sample 19 are shown in Table 2.

In Table 2, the amount of bound styrene, the amount of bound vinyl, the glass transition temperature, the branch number and the absolute molecular weights of this sample are shown in corresponding columns of Modified Conjugated Diene-based Polymer.

(Modified Conjugated Diene-Based Polymer (Sample 20))

Two tank pressure vessels, each of which is a stirrer-equipped tank reactor having an internal volume of 10 L and a ratio (L/D) of internal height (L) and diameter (D) of 4.0, having an inlet at a bottom and an outlet at a top, and equipped with a stirrer and a temperature controlling jacket, were connected to each other as polymerization reactors.

1,3-Butadiene, from which a water content had been precedently removed, styrene and n-hexane were mixed under conditions of 18.6 g/min, 10.0 g/min and 175.2 g/min, respectively. In a static mixer provided in the middle of a pipe for supplying the thus obtained mixed solution to the inlet of the reactor, n-butyllithium to be used for residual impurity inactivation was added and mixed in an amount of 0.103 mmol/min, and the resultant was continuously supplied to the bottom of the reactor. Besides, 2,2-bis(2-oxolanyl)propane used as a polar material and n-butyllithium used as a polymerization initiator were supplied, at rates of respectively 0.081 mmol/min and 0.143 mmol/min, to the bottom of the first reactor in which materials were vigorously mixed by the stirrer, and the internal temperature of the reactor was kept at 67° C.

The thus obtained polymer solution was continuously taken out from the top of the first reactor to be continuously supplied to the bottom of the second reactor for continuing the reaction at 70° C., and the resultant was further supplied to a static mixer from the top of the second reactor. When the polymerization was sufficiently stabilized, a small amount of a polymer solution prior to addition of a modifier was taken out, an antioxidant (BHT) was added thereto in an amount of 0.2 g per 100 g of the polymer, then the solvent was removed, and a Mooney viscosity at 110° C. and various molecular weights were measured. The other physical properties are also shown in Table 3.

Next, to the polymer solution flowing out of an outlet of the reactor, 2,2-dimethoxy-1-(3-trimethoxysilylpropyl)-1-aza-2-silacyclopentane (shown as "A" in the table) was added, as a modifier, continuously at a rate of 0.0360 mmol/min, and the resultant was mixed by using a static mixer for performing a modification reaction. Here, a time until the addition of the modifier to the polymer solution flowing out of the outlet of the reactor was 4.8 min, the temperature was 68° C., and a difference between the temperature in the polymerizing step and the temperature until the addition of the modifier was 2° C. To the polymer solution having been subjected to the modification reaction, an antioxidant (BHT) was added in an amount of 0.2 g per 100 g of the polymer continuously at 0.055 g/min (n-hexane solution) to complete the modification reaction. Simultaneously with the antioxidant, an oil (JOMO Process NC 140, manufactured by JX Nippon Oil & Energy Corporation) was continuously added in an amount of 37.5 g per 100 g of the polymer, and the resultant was mixed by using a static mixer. The solvent was removed by steam stripping, and thus, a modified conjugated diene-based polymer (sample 20) was obtained. Physical properties of the sample 20 are shown in Table 3.

(Modified Conjugated Diene-Based Polymer (Sample 21))

A modified conjugated diene-based polymer (sample 21) was obtained in the same manner as in the sample 20 except that the modifier was changed from 2,2-dimethoxy-1-(3-trimethoxysilylpropyl)-1-aza-2-silacyclopentane to tris(3-trimethoxysilylpropyl)amine (shown as "B" in the table"), and that the amount thereof to be added was changed to 0.0250 mmol/min. Physical properties of the sample 21 are shown in Table 3.

(Modified Conjugated Diene-Based Polymer (Sample 22))

A modified conjugated diene-based polymer (sample 22) was obtained in the same manner as in the sample 20 except that the modifier was changed from 2,2-dimethoxy-1-(3-trimethoxysilylpropyl)-1-aza-2-silacyclopentane to tetrakis (3-trimethoxysilylpropyl)-1,3-propanediamine (shown as "C" in the table"), and that the amount thereof to be added was changed to 0.0190 mmol/min. Physical properties of the sample 22 are shown in Table 3.

(Modified Conjugated Diene-Based Polymer (Sample 23))

A modified conjugated diene-based polymer (sample 23) was obtained in the same manner as in the sample 1 except that the amount of 2,2-bis(2-oxolanyl)propane to be added as the polar material was changed to a rate of 0.098 mmol/min, that the amount of n-butyllithium to be added as the polymerization initiator was changed to a rate of 0.188 mmol/min, that the amount of trimethoxy(4-vinylphenyl) silane (shown as "BS-1" in the table) to be added as the branching agent was changed to 0.0350 mmol/min, and that the amount of 2,2-dimethoxy-1-(3-trimethoxysilylpropyl)-1-aza-2-silacyclopentane to be added as the modifier was changed to 0.0510 mmol/min. Physical properties of the sample 23 are shown in Table 3.

(Modified Conjugated Diene-Based Polymer (Sample 24))

A modified conjugated diene-based polymer (sample 24) was obtained in the same manner as the sample 1 except that the amount of 1,3-butadiene to be added was changed to 18.6 g/min, and that the amount of styrene to be added was changed to 10.0 g/min. Physical properties of the sample 24 are shown in Table 3.

(Modified Conjugated Diene-Based Polymer (Sample 25))

An autoclave having an internal volume of 10 L and equipped with a stirrer and a jacket was washed and dried, and after replacing the atmosphere with nitrogen, was charged with 720 g of 1,3-butadiene from which impurities such as a moisture content had been precedently removed, 80 g of styrene, and 5 kg of cyclohexane. Subsequently, 1.90 mmol of 2,2-bis(2-oxolanyl)propane was added thereto as a polar material, 2.5 mmol of n-butyllithium was added thereto, and polymerization was started at 52° C. The polymerization was carried out as adiabatic polymerization, and a maximum temperature reached 70° C. The polymerization was continued further 5 minutes after reaching the maximum temperature, and then, the resultant reaction solution, namely, a polymer solution containing a conjugated diene-based polymer consisting of a conjugated diene compound and an aromatic vinyl compound, was sampled to perform analysis after removing the solvent.

Next, to the sampled polymer solution, a cyclohexane solution containing 1.3 mmol of a compound M-1 (a compound represented by the formula M-1 described in <Compound used in Modification Step> above) was added as a modifier to perform a reaction over 15 minutes. To the thus obtained polymer solution, 2 g of an antioxidant (BHT) was added, and thereafter, the solvent was removed to obtain a modified conjugated diene-based polymer (sample 25).

The amount of bound styrene in the sample 25 was 10% by mass, the amount of bound vinyl was 30% by mol, and the glass transition temperature was −60° C.

TABLE 1

| | | | Conjugated Diene-based Polymer (Sample No.) | | | | | | | | |
|---|---|---|---|---|---|---|---|---|---|---|---|
| | | | 1 | 2 | 3 | 4 | 5 | 6 | 7 | 8 | 9 |
| Polymerization Conditions | Butadiene | g/min | 17.0 | 17.0 | 17.0 | 17.0 | 17.0 | 17.0 | 17.0 | 17.0 | 17.0 |
| | Styrene | g/min | 11.4 | 11.4 | 11.4 | 11.4 | 11.4 | 11.4 | 11.4 | 11.4 | 11.4 |
| | n-Hexane | g/min | 175.2 | 175.2 | 175.2 | 175.2 | 175.2 | 175.2 | 175.2 | 175.2 | 175.2 |
| | Polymerization Temperature | (°C.) | 70 | 70 | 70 | 70 | 70 | 70 | 70 | 70 | 70 |
| | n-Butyllithium for Treatment | mmol/min | 0.103 | 0.103 | 0.103 | 0.103 | 0.103 | 0.103 | 0.103 | 0.103 | 0.103 |
| | n-Butyllithium for Polymerization Initiator | mmol/min | 0.143 | 0.143 | 0.143 | 0.143 | 0.143 | 0.143 | 0.143 | 0.143 | 0.143 |
| | Amount of Polar Material Added | mmol/min | 0.075 | 0.075 | 0.075 | 0.075 | 0.075 | 0.075 | 0.075 | 0.075 | 0.075 |
| | Branching Agent Type | | BS-1 | BS-1 | BS-1 | BS-2 | BS-2 | BS-2 | BS-3 | BS-3 | BS-3 |
| | Amount Added | mmol/min | 0.0190 | 0.0190 | 0.0190 | 0.0350 | 0.0350 | 0.0350 | 0.0120 | 0.0120 | 0.0120 |
| | Modifier Type | | A | B | C | A | B | C | A | B | C |
| | Amount Added | mmol/min | 0.0360 | 0.0250 | 0.0190 | 0.0360 | 0.0250 | 0.0160 | 0.0360 | 0.0250 | 0.0160 |
| Physical Properties | Unmodified Conjugated Diene-based Polymer | (Physical Property 3) Weight Average Molecular Weight (10⁴ g/mol) | 63.9 | 63.9 | 63.9 | 60.3 | 60.3 | 60.3 | 74.5 | 74.5 | 74.5 |
| | | (Physical Property 3) Number Average Molecular Weight (10⁴ g/mol) | 33.1 | 33.1 | 33.1 | 32.2 | 32.2 | 32.2 | 37.8 | 37.8 | 37.8 |
| | | (Physical Property 5) Mooney Viscosity (110° C.) | 92.1 | 92.1 | 92.1 | 88.2 | 88.2 | 88.2 | 99.1 | 99.1 | 99.1 |
| | | (Physical Property 3) Mw/Mn | 1.93 | 1.93 | 1.93 | 1.87 | 1.87 | 1.87 | 1.97 | 1.97 | 1.97 |
| | | (Physical Property 1) Amount of Bound Styrene (mass %) | 40 | 40 | 40 | 40 | 40 | 40 | 40 | 40 | 40 |
| | | (Physical Property 2) Amount of Bound Vinyl (Amount of 1,2-Bond) (mol %) | 40 | 40 | 40 | 40 | 40 | 40 | 40 | 40 | 40 |
| | Modified Conjugated Diene-based Polymer | (Physical Property 3) Weight Average Molecular Weight (10⁴ g/mol) | 92.0 | 96.0 | 105.3 | 86.8 | 90.6 | 99.4 | 115.0 | 121.0 | 135.0 |
| | | (Physical Property 3) Number Average Molecular Weight (10⁴ g/mol) | 46.7 | 48.7 | 53.4 | 43.8 | 46.5 | 51.5 | 57.2 | 62.4 | 69.6 |
| | | (Physical Property 3) Mw/Mn | 1.97 | 1.97 | 1.97 | 1.98 | 1.95 | 1.93 | 2.01 | 1.94 | 1.94 |
| | | (Physical Property 4) Contracting Factor (g') | 0.52 | 0.40 | 0.32 | 0.53 | 0.45 | 0.37 | 0.28 | 0.21 | 0.18 |
| | | (Physical Property 5) Mooney Viscosity of Polymer (100° C.) | 83 | 83 | 83 | 79 | 84 | 82 | 81 | 84 | 82 |

TABLE 2

| | | | Conjugated Diene-based Polymer (Sample No.) | | | | | | | | | |
|---|---|---|---|---|---|---|---|---|---|---|---|---|
| | | | 10 | 11 | 12 | 13 | 14 | 15 | 16 | 17 | 18 | 19 |
| Polymerization Conditions | | Butadiene | g/min | 17.0 | 17.0 | 17.0 | 17.0 | 17.0 | 17.0 | 17.0 | 17.0 | 17.0 | 17.0 |
| | | Styrene | g/min | 11.4 | 11.4 | 11.4 | 11.4 | 11.4 | 11.4 | 11.4 | 11.4 | 11.4 | 11.4 |
| | | n-Hexane | g/min | 175.2 | 175.2 | 175.2 | 175.2 | 175.2 | 175.2 | 175.2 | 175.2 | 175.2 | 175.2 |
| | | Polymerization Temperature | (° C.) | 70 | 70 | 70 | 70 | 70 | 70 | 70 | 70 | 70 | 70 |
| | | n-Butyllithium for Treatment | mmol/min | 0.103 | 0.103 | 0.103 | 0.103 | 0.103 | 0.103 | 0.103 | 0.103 | 0.103 | 0.103 |
| | | n-Butyllithium of Polymerization Initiator | mmol/min | 0.143 | 0.143 | 0.143 | 0.143 | 0.143 | 0.143 | 0.143 | 0.143 | 0.143 | 0.143 |
| | | Amount of Polar Material Added | mmol/min | 0.075 | 0.075 | 0.075 | 0.075 | 0.075 | 0.075 | 0.075 | 0.075 | 0.075 | 0.075 |
| | Branching Agent | Type | | BS-4 | BS-4 | BS-4 | BS-5 | BS-5 | BS-5 | BS-1 | BS-1 | BS-1 | BS-1 |
| | | Amount Added | | 0.0210 | 0.0210 | 0.0210 | 0.0190 | 0.0190 | 0.0190 | 0.0250 | 0.0190 | 0.0190 | 0.0190 |
| | Modifier | Type | | A | B | C | A | B | C | C | C | D | — |
| | | Amount Added | mmol/min | 0.0360 | 0.0250 | 0.0160 | 0.0360 | 0.0250 | 0.0190 | 0.0160 | 0.0110 | 0.0250 | — |
| Physical Properties | Unmodified Conjugated Diene-based Polymer | (Physical Property 3) Weight Average Molecular Weight | (10⁴ g/mol) | 61.5 | 61.5 | 61.5 | 63.9 | 63.9 | 63.9 | 78.6 | 89.3 | 63.9 | 63.9 |
| | | (Physical Property 3) Number Average Molecular Weight | (10⁴ g/mol) | 31.1 | 31.1 | 31.1 | 33.1 | 33.1 | 33.1 | 40.1 | 45.1 | 33.1 | 33.1 |
| | | (Physical Property 5) Mooney Viscosity (110° C.) | | 90.6 | 90.6 | 90.6 | 92.1 | 92.1 | 92.1 | 98.1 | 105.3 | 92.1 | 92.1 |
| | | (Physical Property 3) Mw/Mn (Physical Property 1) | | 1.98 | 1.98 | 1.98 | 1.93 | 1.93 | 1.93 | 1.96 | 1.98 | 1.93 | 1.93 |
| | | Amount of Bound Styrene | (mass %) | 40 | 40 | 40 | 40 | 40 | 40 | 40 | 40 | 40 | 40 |

TABLE 3

| | | | Conjugated Diene-based Polymer (Sample No.) | | | | |
|---|---|---|---|---|---|---|---|
| | | | 20 | 21 | 22 | 23 | 24 |
| Poly-merization | Butadiene | g/min | 17.0 | 17.0 | 17.0 | 17.0 | 18.6 |
| | Styrene | g/min | 11.4 | 11.4 | 11.4 | 11.4 | 10.0 |
| | n-Hexane | g/min | 175.2 | 175.2 | 175.2 | 175.2 | 175.2 |
| | Polymerization Temperature | (° C.) | 70 | 70 | 70 | 70 | 70 |
| | n-Butyllithium for Treatment | mmol/min | 0.103 | 0.103 | 0.103 | 0.103 | 0.103 |
| | n-Butyllithium of Polymerization Initiator | mmol/min | 0.143 | 0.143 | 0.143 | 0.188 | 0.143 |
| | Amount of Polar Material Added | mmol/min | 0.075 | 0.075 | 0.075 | 0.098 | 0.075 |
| | Branching Type | | — | — | — | BS-1 | BS-1 |
| | Agent Amount Added | mmol/min | — | — | — | 0.0350 | 0.0190 |
| | Modifier Type | | A | B | C | A | A |
| | Amount Added | mmol/min | 0.0360 | 0.0250 | 0.0190 | 0.0510 | 0.0360 |
| Physical Properties | Unmodified Conjugated Diene-based Polymer | (Physical Property 3) Weight Average Molecular Weight | ($10^4$ g/mol) | 48.9 | 48.9 | 48.9 | 18.9 | 49.0 |
| | | (Physical Property 3) Number Average Molecular Weight | ($10^4$ g/mol) | 27.9 | 27.9 | 27.9 | 9.6 | 28.0 |
| | | (Physical Property 5) Mooney Viscosity (110° C.) | | 72.5 | 72.5 | 72.5 | 25 | 72.6 |
| | | (Physical Property 3) Mw/Mn | | 1.75 | 1.75 | 1.75 | 1.97 | 1.75 |
| | Modified Conjugated Diene-based Polymer | (Physical Property 1) Amount of Bound Styrene | (mass %) | 40 | 40 | 40 | 40 | 35 |
| | | (Physical Property 2) Amount of Bound Vinyl (Amount of 1,2-Bond) | (mol %) | 40 | 40 | 40 | 40 | 40 |
| | | (Physical Property 3) Weight Average Molecular Weight | ($10^4$ g/mol) | 82.1 | 94.3 | 117.4 | 27.2 | 82.1 |
| | | (Physical Property 3) Number Average Molecular Weight | ($10^4$ g/mol) | 40.8 | 47.9 | 53.4 | 13.5 | 40.8 |
| | | (Physical Property 3) Mw/Mn | | 2.01 | 1.97 | 1.98 | 2.01 | 2.01 |
| | | (Physical Property 4) Contracting Factor (g') | | 0.91 | 0.74 | 0.56 | 0.52 | 0.51 |
| | | (Physical Property 5) Mooney Viscosity of Polymer (100° C.) | | 75 | 83 | 96 | 40 | 75 |
| | | (Physical Property 6) Glass Transition Temperature | (° C.) | −15 | −15 | −15 | −15 | −23 |
| | | (Physical Property 7) Modification Ratio | (%) | 83 | 86 | 80 | 82 | 83 |
| | | (Physical Property 8) Branch Number (Bn) | per molecule | 2.9 | 4.6 | 7.4 | 8.4 | 8.5 |
| | | (Physical Property 9) Absolute Weight (Mw − i) | ($10^4$ Daltons) | 96 | 97 | 142 | 38 | 96 |

[Examples 1 to 19] and [Comparative Examples 1 to 5]

In accordance with the following compositions, conjugated diene-based polymer compositions respectively containing respective raw material rubbers were obtained.

Raw Material Rubber: 100 parts by mass (50 parts by mass of a corresponding one of the conjugated diene-based polymers shown in Tables 1 to 3 (Samples 1 to 24), and 50 parts by mass of a modified conjugated diene-based polymer (trade name "SLR3402" manufactured by Trinseo, glass transition temperature: −60° C.)

Silica (trade name "Ultrasil 7000GR" manufactured by Evonik Degussa, nitrogen absorption specific surface area: 170 m²/g): 50.0 parts by mass Carbon black (trade name "Seast KH (N339)", manufactured by Tokai Carbon Co., Ltd.): 5.0 parts by mass Silane coupling agent: (trade name "Si75", manufactured by Evonik Degussa, bis(triethoxysilylpropyl)disulfide): 6.0 parts by mass S-RAE oil (trade name "Process NC140", manufactured by JX Nippon Oil & Energy Corporation): 36 parts by mass Thermoplastic Resin (trade name "Neopolymer 120" manufactured by JXTG Nippon Oil & Energy Corporation): 8 parts by mass Zinc oxide: 2.5 parts by mass Stearic acid: 1.0 part by mass Anti-ageing agent (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazylsulfinamide): 1.7 parts by mass Vulcanization accelerator 2 (diphenylguanidine): 2.0 parts by mass Example 20

A conjugated diene-based polymer composition was obtained in the same manner as in Example 1 except that the composition of the raw material rubber was changed as follows:

Modified Conjugated Diene-based Polymer (sample 1): 50 parts by mass

Modified Conjugated Diene-based Polymer (sample 25, glass transition temperature: −60° C.): 50 parts by mass Example 21

A conjugated diene-based polymer composition was obtained in the same manner as in Example 1 except that the composition of the raw material rubber was changed as follows:

Modified Conjugated Diene-based Polymer (sample 1): 20 parts by mass
Modified Conjugated Diene-based Polymer (trade name "SLR3402" manufactured by Trinseo, glass transition temperature: −60° C.): 80 parts by mass Example 22

A conjugated diene-based polymer composition was obtained in the same manner as in Example 1 except that the composition of the raw material rubber was changed as follows:
Modified Conjugated Diene-based Polymer (sample 1): 80 parts by mass
Modified Conjugated Diene-based Polymer (trade name "SLR3402" manufactured by Trinseo, glass transition temperature: −60° C.): 20 parts by mass Example 23

A conjugated diene-based polymer composition was obtained in the same manner as in Example 1 except that the compositions of the thermoplastic resin and the oil were changed as follows:
Thermoplastic Resin (trade name "Neopolymer 120" manufactured by JXTG Nippon Oil & Energy Corporation): 15 parts by mass
S-RAE Oil (trade name "Process NC140", manufactured by JX Nippon Oil & Energy Corporation): 27 parts by mass Example 24

A conjugated diene-based polymer composition was obtained in the same manner as in Example 1 except that the composition of the raw material rubber was changed as follows:
Modified Conjugated Diene-based Polymer (sample 1): 50 parts by mass
Conjugated Diene-based Polymer (trade name "Tufdene 1834" manufactured by Asahi Kasei Corporation, glass transition temperature: −73° C.): 50 parts by mass Example 25

A conjugated diene-based polymer composition was obtained in the same manner as in Example 1 except that the composition of the raw material rubber was changed as follows:
Conjugated Diene-based Polymer (sample 19): 50 parts by mass
Conjugated Diene-based Polymer (trade name "Tufdene 1834" manufactured by Asahi Kasei Corporation, glass transition temperature: −73° C.): 50 parts by mass Comparative Example 6

A modified conjugated diene-based polymer composition was obtained in the same manner as in Example 1 except that the composition of the raw material rubber was changed as follows:
Modified Conjugated Diene-based Polymer (sample 1): 5 parts by mass
Modified Conjugated Diene-based Polymer (trade name "SLR3402" manufactured by Trinseo, glass transition temperature: −60° C.): 95 parts by mass Comparative Example 7

A modified conjugated diene-based polymer composition was obtained in the same manner as in Example 1 except that the composition of the raw material rubber was changed as follows:
Modified Conjugated Diene-based Polymer (sample 1): 95 parts by mass
Modified Conjugated Diene-based Polymer (trade name "SLR3402" manufactured by Trinseo, glass transition temperature: −60° C.): 5 parts by mass Comparative Example 8

A modified conjugated diene-based polymer composition was obtained in the same manner as in Example 1 except that the composition of the raw material rubber was changed as follows:
Modified Conjugated Diene-based Polymer (trade name "SLR3402" manufactured by Trinseo, glass transition temperature: −60° C.): 100 parts by mass Comparative Example 9

A modified conjugated diene-based polymer composition was obtained in the same manner as in Example 1 except that the composition of the raw material rubber was changed as follows:
Modified Conjugated Diene-based Polymer (sample 1): 100 parts by mass Example 26

A modified conjugated diene-based polymer composition was obtained in the same manner as in Example 1 except that the compositions of the thermoplastic resin and the oil were changed as follows:
Thermoplastic Resin (trade name "Neopolymer 120" manufactured by JXTG Nippon Oil & Energy Corporation): 35 parts by mass
S-RAE Oil (trade name "Process NC140", manufactured by JX Nippon Oil & Energy Corporation): 7 parts by mass Example 27

A modified conjugated diene-based polymer composition was obtained in the same manner as in Example 1 except that the thermoplastic resin was not added, and that the composition of the oil was changed as follows:
S-RAE oil (trade name "Process NC140", manufactured by JX Nippon Oil & Energy Corporation): 42 parts by mass Example 28

A modified conjugated diene-based polymer composition was obtained in the same manner as in Example 1 except that the composition of the raw material rubber was changed as follows:
Modified Conjugated Diene-based Polymer (sample 1): 80 parts by mass
Modified Conjugated Diene-based Polymer (trade name "HPR350" manufactured by JSR Corporation, glass transition temperature: −34° C.): 20 parts by mass

Example 29

A modified conjugated diene-based polymer composition was obtained in the same manner as in Example 1 except that the composition of the raw material rubber was changed as follows:
  Modified Conjugated Diene-based Polymer (sample 1): 20 parts by mass
  Modified Conjugated Diene-based Polymer (trade name "HPR350" manufactured by JSR Corporation, glass transition temperature: −34° C.): 30 parts by mass

Comparative Example 10

A modified conjugated diene-based polymer composition was obtained in the same manner as in Example 1 except that the composition of the raw material rubber was changed as follows:
  Modified Conjugated Diene-based Polymer (trade name "HPR350" manufactured by JSR Corporation, glass transition temperature: −34° C.): 30 parts by mass The above-described materials were kneaded by the following method to obtain a rubber composition. A closed kneader (having an internal volume of 0.3 L) equipped with a temperature controller was used to knead, as a first stage of kneading, the raw material rubber, the fillers (silica 1, silica 2 and carbon black), the silane coupling agent, the process oil, zinc oxide and stearic acid under conditions of a filling ratio of 65% and a rotor rotation speed of 30 to 50 rpm. Here, the temperature of the closed mixer was controlled to obtain each rubber composition (compound) at a discharging temperature of 155 to 160° C.

Next, after cooling the compound obtained as described above to room temperature, as a second stage of the kneading, the anti-ageing agent was added thereto, and the resultant was kneaded again to improve dispersibility of the silica. Also in this case, the discharging temperature for the compound was adjusted to 155 to 160° C. by the temperature control of a kneader. After cooling, as a third stage of the kneading, sulfur and the vulcanization accelerators 1 and 2 were added, and the resultant was kneaded by an open roll set to 70° C. Thereafter, the resultant was molded and vulcanized at 160° C. for 20 minutes by a vulcanizing press.

A characteristic of the rubber compositions prior to the vulcanization, and the rubber compositions after the vulcanization were evaluated. Specifically, the evaluations were performed as described below. Results are shown in Tables 4 to 8.

[Evaluation of Characteristic]

(Evaluation 1) Mooney Viscosity of Compound

Each compound obtained after the second stage of the kneading and before the third stage of the kneading was used as a sample to measure a viscosity by using a Mooney viscometer in accordance with JIS K6300-1 after preheating the compound at 130° C. for 1 minute, and after rotating a rotor for 4 minutes at 2 rpm. The thus obtained viscosity was shown as an index obtained assuming that a result of Comparative Example 1 was 100. A smaller index indicates better processability.

(Evaluation 2) Viscoelasticity Parameter

A viscoelasticity testing machine "ARES" manufactured by Rheometric Scientific, Inc. was used to measure a viscoelasticity parameter in a torsion mode. Each measurement value was shown as an index obtained assuming that a result obtained by the rubber composition of Comparative Example 1 was 100.

A tan δ measured at 0° C. at a frequency of 10 Hz and strain of 1% was used as an index of wet performance. A larger index indicates better wet performance. Besides, a tan δ measured at 50° C. at a frequency of 10 Hz and strain of 3% was used as an index of fuel efficiency. A smaller index indicates higher fuel efficiency and excellent rolling resistance.

(Evaluation 3) Tensile Strength

Tensile strength was measured in accordance with a tensile test method according to JIS K6251, and was shown as an index obtained assuming that a result of Comparative Example 1 was 100. A larger index indicates better tensile strength and excellent fracture strength.

(Evaluation 4) Abrasion Resistance

An Acron abrasion tester (manufactured by Yasuda Seiki Seisakusho, Ltd.) was used to measure an abrasion amount through 1000 rotations at a load of 44.4 N in accordance with JIS K6264-2, and results were shown as indexes obtained assuming that a result of Comparative Example 1 was 100. A larger index indicates better abrasion resistance.

TABLE 4

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Conjugated Diene-based Polymer (Sample No.) | | | 1 | 2 | 3 | 4 | 5 | 6 | 7 | 8 | 9 | 10 |
| (Evaluation 1) Mooney Viscosity of Compound (130° C.) | | index | 83 | 85 | 80 | 78 | 84 | 85 | 78 | 78 | 78 | 78 |
| Physical Properties of Vulcanizate | (Evaluation 2) 50° C. tanδ (strain 3%) | index | 80 | 75 | 70 | 73 | 82 | 83 | 73 | 73 | 75 | 77 |
| | (Evaluation 2) 0° C. tanδ (strain 1%) | index | 120 | 125 | 130 | 128 | 115 | 120 | 128 | 124 | 120 | 121 |

TABLE 4-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (Evaluation 3) Tensile Strength | index | 110 | 125 | 130 | 140 | 109 | 125 | 130 | 143 | 150 | 155 |
| (Evaluation 4) Abrasion Resistance | index | 125 | 130 | 140 | 150 | 123 | 130 | 145 | 160 | 162 | 165 |

TABLE 5

|  |  |  | Example 11 | Example 12 | Example 13 | Example 14 | Example 15 | Example 16 | Example 17 | Example 18 | Example 19 |
|---|---|---|---|---|---|---|---|---|---|---|---|
| Conjugated Diene-based Polymer (Sample No.) |  |  | 11 | 12 | 13 | 14 | 15 | 16 | 17 | 18 | 19 |
| (Evaluation 1) Mooney Viscosity of Compound (130° C.) |  | index | 89 | 87 | 82 | 86 | 85 | 78 | 82 | 84 | 100 |
| Physical Properties of Vulcanizate | (Evaluation 2) 50° C. tanδ (strain 3%) | index | 85 | 80 | 75 | 80 | 75 | 83 | 100 | 105 | 102 |
| | (Evaluation 2) 0° C. tanδ (strain 1%) | index | 115 | 120 | 125 | 120 | 125 | 130 | 108 | 100 | 100 |
| | (Evaluation 3) Tensile Strength | index | 110 | 120 | 125 | 110 | 125 | 112 | 110 | 120 | 118 |
| | (Evaluation 4) Abrasion Resistance | index | 124 | 130 | 140 | 125 | 130 | 125 | 130 | 120 | 118 |

|  |  |  | Comparative Example 1 | Comparative Example 2 | Comparative Example 3 | Comparative Example 4 | Comparative Example 5 |
|---|---|---|---|---|---|---|---|
| Conjugated Diene-based Polymer (Sample No.) |  |  | 20 | 21 | 22 | 23 | 24 |
| (Evaluation 1) Mooney Viscosity of Compound (130° C.) |  | index | 100 | 98 | 94 | 40 | 101 |
| Physical Properties of Vulcanizate | (Evaluation 2) 50° C. tanδ (strain 3%) | index | 100 | 90 | 85 | 70 | 110 |
| | (Evaluation 2) 0° C. tanδ (strain 1%) | index | 100 | 103 | 109 | 109 | 105 |
| | (Evaluation 3) Tensile Strength | index | 100 | 95 | 90 | 78 | 100 |
| | (Evaluation 4) Abrasion Resistance | index | 100 | 110 | 115 | 76 | 90 |

TABLE 6

|  |  |  | Example 20 | Example 21 | Example 22 | Example 23 | Example 24 | Example 25 | Example 26 | Example 27 | Example 28 | Example 29 |
|---|---|---|---|---|---|---|---|---|---|---|---|---|
| (Evaluation 1) Mooney Viscosity of Compound (130° C.) |  | index | 85 | 83 | 87 | 93 | 105 | 103 | 125 | 100 | 82 | 90 |
| Physical Properties of Vulcanizate | (Evaluation 2) 50° C. tanδ (strain 3%) | index | 70 | 65 | 95 | 98 | 98 | 105 | 140 | 98 | 95 | 92 |
| | (Evaluation 2) 0° C. tanδ (strain 1%) | index | 120 | 105 | 130 | 140 | 105 | 99 | 144 | 86 | 150 | 123 |
| | (Evaluation 3) Tensile Strength | index | 115 | 123 | 110 | 132 | 100 | 110 | 110 | 94 | 102 | 100 |
| | (Evaluation 4) Abrasion Resistance | index | 125 | 130 | 102 | 100 | 100 | 101 | 80 | 100 | 100 | 98 |

TABLE 8

|  |  |  | Comparative Example 6 | Comparative Example 7 | Comparative Example 8 | Comparative Example 9 | Comparative Example 10 |
|---|---|---|---|---|---|---|---|
|  | (Evaluation 1) Mooney Viscosity of Compound (130° C.) | index | 92 | 102 | 110 | 100 | 102 |
| Physical | (Evaluation 2) 50° C. tanδ (strain 3%) | index | 60 | 115 | 60 | 130 | 90 |
| Properties | (Evaluation 2) 0° C. tanδ (strain 1%) | index | 80 | 140 | 70 | 152 | 92 |
| of | (Evaluation 3) Tensile Strength | index | 100 | 100 | 105 | 90 | 100 |
| Vulcanizate | (Evaluation 4) Abrasion Resistance | index | 135 | 90 | 130 | 82 | 98 |

As shown in Tables 4 to 8, Examples 1 to 29 have, as compared with Comparative Examples 1 to 10, such a low Mooney viscosity of the compound when in the form of a vulcanizate that good processability can be exhibited, and thus, were confirmed to be excellent in rolling resistance when in the form of a vulcanizate, grip performance on a wet road surface, and abrasion resistance.

INDUSTRIAL APPLICABILITY

A conjugated diene-based polymer composition of the present invention is industrially applicable in the fields of tire treads, interiors/exteriors of vehicles, anti-vibration rubbers, belts, shoes, foam bodies, and various industrial products.

The invention claimed is:

1. A conjugated diene-based polymer composition comprising:
10 to 90 parts by mass of a conjugated diene-based polymer (A) having a glass transition temperature of −20° C. or more; and
10 to 90 parts by mass of a conjugated diene-based polymer (B) having a glass transition temperature of −25° C. or less,
wherein the conjugated diene-based polymer (A) has an absolute molecular weight, measured by viscosity detector-equipped GPC-light scattering measurement, of $40 \times 10^4$ or more and $5000 \times 10^4$ or less, and a branch number (Bn), measured by the viscosity detector-equipped GPC-light scattering measurement, of 8 or more.

2. The conjugated diene-based polymer composition according to claim 1, wherein the conjugated diene-based polymer (B) has a glass transition temperature of −55° C. or less.

3. The conjugated diene-based polymer composition according to claim 1, comprising 0.5 parts by mass or more and 30 parts by mass or less of a thermoplastic resin with respect to 100 parts by mass of a total amount of the conjugated diene-based polymers (A) and (B).

4. The conjugated diene-based polymer composition according to claim 1, wherein the conjugated diene-based polymer (A) and/or the conjugated diene-based polymer (B) is modified.

5. The conjugated diene-based polymer composition according to claim 4, wherein the conjugated diene-based polymer (A) has a modification ratio of 60% by mass or more.

6. The conjugated diene-based polymer composition according to claim 3, wherein a content of the thermoplastic resin is 0.5 parts by mass or more and 10 parts by mass or less with respect to 100 parts by mass of the total amount of the conjugated diene-based polymers (A) and (B).

7. The conjugated diene-based polymer composition according to claim 1, wherein the conjugated diene-based polymer (A) is a conjugated diene-based polymer having a star polymer structure having 3 or more branches, in which at least one branched chain of the star structure includes a portion derived from a vinyl-based monomer containing an alkoxysilyl group or a halosilyl group, and a polymer chain is branched in the portion derived from a vinyl-based monomer containing an alkoxysilyl group or a halosilyl group.

8. The conjugated diene-based polymer composition according to claim 7, wherein
the portion, of the conjugated diene-based polymer (A), derived from a vinyl-based monomer containing an alkoxysilyl group or a halosilyl group is a monomer unit based on a compound represented by the following formula (1) or (2), and has a branch point of a polymer chain containing the monomer unit based on the compound represented by the following formula (1) or (2), and
at least one end of the conjugated diene-based polymer (A) is coupled by using a coupling agent:

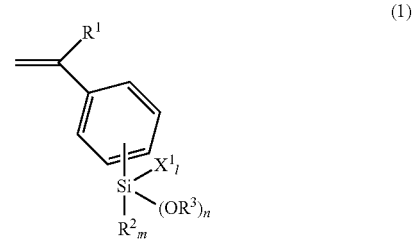

(1)

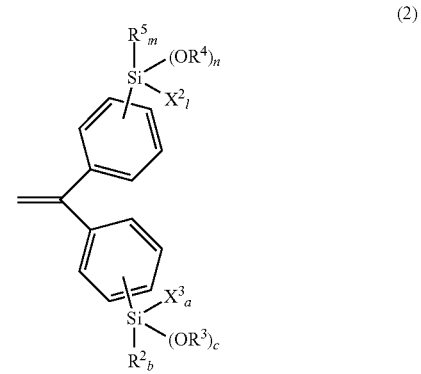

(2)

wherein in the formula (1), $R^1$ represents a hydrogen atom, an alkyl group having 1 to 20 carbon atoms, or an aryl group having 6 to 20 carbon atoms, and may have a branch structure in a part thereof;

$R^2$ and $R^3$ each independently represent an alkyl group having 1 to 20 carbon atoms, or an aryl group having 6 to 20 carbon atoms, and may have a branch structure in a part thereof;

each of $R^1$ to $R^3$, if present in a plural number, is respectively independent;

$X^1$ represents an independent halogen atom;

m represents an integer of 0 to 2, n represents an integer of 0 to 3, l represents an integer of 0 to 3, and (m+n+l) is 3;

in the formula (2), $R^2$ to $R^5$ each independently represent an alkyl group having 1 to 20 carbon atoms, or an aryl group having 6 to 20 carbon atoms, and may have a branch structure in a part thereof, and each of $R^2$ to $R^5$, if present in a plural number, is respectively independent;

$X^2$ and $X^3$ represent an independent halogen atom;

m represents an integer of 0 to 2, n represents an integer of 0 to 3, l represents an integer of 0 to 3, and (m+n+l) is 3; and a represents an integer of 0 to 2, b represents an integer of 0 to 3, c represents an integer of 0 to 3, and (a+b+c) is 3.

9. The conjugated diene-based polymer composition according to claim 8, comprising the conjugated diene-based polymer (A) containing a monomer unit based on a compound represented by the formula (1) wherein $R^1$ is a hydrogen atom, and m is 0.

10. The conjugated diene-based polymer composition according to claim 8, comprising the conjugated diene-based polymer (A) containing a monomer unit based on a compound represented by the formula (2) wherein m is 0, and b is 0.

11. The conjugated diene-based polymer composition according to claim 8, comprising the conjugated diene-based polymer (A) containing a monomer unit based on a compound represented by the formula (1) wherein $R^1$ is a hydrogen atom, m is 0, and l is 0.

12. The conjugated diene-based polymer composition according to claim 8, comprising the conjugated diene-based polymer (A) containing a monomer unit based on a compound represented by the formula (2) wherein m is 0, l is 0, a is 0, and b is 0.

13. A tire comprising the conjugated diene-based polymer composition according to claim 1.

* * * * *